(12) United States Patent
Takenaka

(10) Patent No.: US 7,770,677 B2
(45) Date of Patent: Aug. 10, 2010

(54) IN-WHEEL SUSPENSION

(75) Inventor: Hidehiro Takenaka, Nishikamo-gun (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 206 days.

(21) Appl. No.: 11/814,708

(22) PCT Filed: Aug. 7, 2006

(86) PCT No.: PCT/IB2006/002160

§ 371 (c)(1),
(2), (4) Date: Jul. 25, 2007

(87) PCT Pub. No.: WO2007/026199

PCT Pub. Date: Mar. 8, 2007

(65) Prior Publication Data

US 2008/0185807 A1 Aug. 7, 2008

(30) Foreign Application Priority Data

Aug. 31, 2005 (JP) ............................. 2005-252327
Oct. 27, 2005 (JP) ............................. 2005-313198

(51) Int. Cl.
*B60K 1/00* (2006.01)
(52) U.S. Cl. ..................... 180/65.51; 280/124.125; 280/93.512
(58) Field of Classification Search ............. 180/65.5; 280/124.125, 124.108
See application file for complete search history.

(56) References Cited

U.S. PATENT DOCUMENTS

| | | | | |
|---|---|---|---|---|
| 4,991,698 A | * | 2/1991 | Hanson | ...................... 188/380 |
| 5,390,757 A | * | 2/1995 | Smith | ........................ 180/227 |
| 5,438,228 A | * | 8/1995 | Couture et al. | ............ 310/67 R |
| 6,364,078 B1 | * | 4/2002 | Parison et al. | ............... 188/380 |
| 7,287,611 B2 | * | 10/2007 | Nagaya | ................... 180/65.51 |
| 7,389,999 B2 | * | 6/2008 | Kimura et al. | ......... 280/93.512 |
| 7,422,080 B2 | * | 9/2008 | Suzuki et al. | ........... 180/65.51 |
| 2007/0289796 A1 | * | 12/2007 | Hopf | ........................ 180/227 |
| 2008/0093133 A1 | * | 4/2008 | Yogo et al. | .................... 180/55 |
| 2008/0100021 A1 | * | 5/2008 | Yamada | .............. 280/124.127 |
| 2008/0203693 A1 | * | 8/2008 | Yamada | .............. 280/124.127 |
| 2008/0283314 A1 | * | 11/2008 | Suzuki et al. | ............. 180/65.5 |
| 2008/0289891 A1 | * | 11/2008 | Yogo et al. | ................. 180/65.5 |
| 2008/0308330 A1 | * | 12/2008 | Murata | ...................... 180/65.5 |

FOREIGN PATENT DOCUMENTS

| | | |
|---|---|---|
| DE | 43 17 510 | 12/1993 |
| FR | 846 448 | 9/1939 |

(Continued)

*Primary Examiner*—Toan C To
(74) *Attorney, Agent, or Firm*—Oblon, Spivak, McClelland, Maier & Neustadt, L.L.P.

(57) ABSTRACT

An in-wheel suspension including a wheel; a carrier that rotatably supports the wheel; an arm (90) that is coupled with a vehicle body, and that extends into the wheel; at least one link that is coupled with the carrier so as to be pivotable about a first shaft substantially parallel to a wheel rotation axis and coupled with the arm so as to be pivotable about a second shaft substantially parallel to the wheel rotation axis, the at least one link extending in a longitudinal direction of a vehicle; and at least one of an elastic element and an attenuation element that is arranged between the carrier and the link.

21 Claims, 24 Drawing Sheets

FOREIGN PATENT DOCUMENTS

| | | |
|---|---|---|
| FR | 2 849 406 | 7/2004 |
| JP | 10338009 | 12/1998 |
| JP | 2000233619 | 8/2000 |
| JP | 2004-90793 | 3/2004 |
| JP | 2005-28911 | 2/2005 |
| JP | 2005-289111 | 10/2005 |
| JP | 2006-306247 | 11/2006 |
| WO | 2005 030509 | 4/2005 |

\* cited by examiner

OUTSIDE ←→ INSIDE

VEHICLE-WIDTH DIRECTION

IN-WHEEL SUSPENSION

FIELD OF THE INVENTION

The invention relates to an in-wheel suspension where main portions of suspension components are arranged in a wheel.

BACKGROUND OF THE INVENTION

Such an in-wheel suspension is described, for example, in Japanese Patent Application Publication No. JP-A-10-338009. The in-wheel suspension described in this publication includes a hub that supports a wheel. The wheel mainly includes a disc and a rim. The rim has a reference width and a reference diameter. The in-wheel suspension includes a wheel carrier that defines the rotational axis of the hub, and a guide member that guides the movement of the wheel carrier with respect to a support member in the axial direction. The support member includes fitting means for fitting the support member to a chassis of a vehicle. The wheel carrier is fitted to the guide member by a long-and-thin single bar, and slides according to the guidance by the guide member. The wheel carrier is prevented from rotating on the sliding axis. The wheel carrier is fitted to the both ends of the bar. The in-wheel suspension includes means for supporting a load of the vehicle transmitted to the wheel carrier by the support member. The wheel carrier, the bar, and the guide member are housed in the wheel along the diameter defined by the reference diameter. The wheel carrier, the bar, and the guide member are housed in a limited space having a shape of a cylinder where one of the surfaces of the cylinder, which extend in the axial direction of the wheel carrier, bar, and the guide member, is defined by the disc of the wheel and the other surface is defined by a virtual surface contacting the rim.

With this in-wheel suspension, however, it is difficult to achieve compliance characteristics for a vehicle such as rigidity against lateral force and rigidity against longitudinal force, and other characteristics required of the suspension.

DISCLOSURE OF THE INVENTION

An object of the invention is to provide an in-wheel suspension in which main portions of suspension components are arranged in a wheel, and which can achieve appropriate compliance characteristics.

An aspect of the invention relates to an in-wheel suspension including a wheel; a carrier that rotatably supports the wheel; an arm that is coupled with a vehicle body, and that extends into the wheel; at least one link that is coupled with the carrier so as to be pivotable about a shaft substantially parallel to the wheel rotation axis and coupled with the arm so as to be pivotable about a shaft substantially parallel to the wheel rotation axis, the at least one link extending in the longitudinal direction of a vehicle; and at least one of an elastic element and an attenuation element that is arranged between the carrier and the link.

A mechanism that guides the movement of the arm in the vertical or substantially vertical direction may be further provided.

The at least one link may includes a second link that is arranged below the first link. At least one of the elastic element and the attenuation element may be arranged between the carrier and the first link or the second link.

The coupling points at which the first link and the second link are coupled with the carrier may be set on the rear side of the wheel center such that a moment for increasing the toe-in-angle is generated when a lateral force is applied to the vehicle.

The line that connects the midpoint between the coupling point at which the first link is coupled with the arm and the coupling point at which the second link is coupled with the arm, to the midpoint between the coupling point at which the first link is coupled with the carrier and the coupling point at which the second link is coupled with the carrier may tilt upward toward the front of the vehicle.

The span length between the coupling point at which the first link is coupled with the arm and the coupling point at which the second link is coupled with the arm may be longer than the span length between the coupling point at which the first link is coupled with the carrier and the coupling point at which the second link is coupled with the carrier.

Each of the first link and the second link may include an arm-side link that is pivotable about the shaft with respect to the arm, and a carrier-side link that is pivotably coupled with the arm-side link and that is pivotable about the shaft with respect to the carrier. One of the first link and the second link may be coupled with the carrier via a first restraining link, and the other of the first link and the second link may be coupled with the carrier via a second restraining link or the first link and the second link may be coupled with each other via the second restraining link.

The second restraining link may couple the first link with the second link, and at least one of the elastic element and the attenuation element may be arranged between the second restraining link and the carrier.

The attenuation element may be a rotary absorber that has a rotating shaft and that attenuates a rotational force transmitted to the rotating shaft. Also, there may be the in-wheel suspension provided a gear that is provided to the first link or the second link, that pivots in accordance with a pivot motion of the first link or the second link, and that transmits the rotational force to the rotating shaft of the rotary absorber.

The rotary absorber may be arranged in a space formed in the end portion of the arm.

Each of the first link and the second link may include an arm-side link that is pivotable about the shaft with respect to the arm, and a carrier-side link that is pivotably coupled with the arm-side link and that is pivotable about the shaft with respect to the carrier. A restraining link may connect the first coupling portion at which the arm-side link and the carrier-side link of the first link are coupled with each other, to the second coupling portion at which the arm-side link and the carrier-side link of the second link are coupled with each other. Also, at least one of the first coupling portion and the second coupling portion may be pivotably coupled with the restraining link via an elastic member.

There may be further provided a sliding shaft member that is provided to the carrier, and that extends in the vertical or substantially vertical direction in the wheel; and a sliding member that is provided around the sliding shaft member so as to be slidable with respect to the sliding shaft member in the axial direction and the circumferential direction of the sliding shaft member, and that is pivotably connected to the arm.

The connection portion at which the sliding shaft member is connected to the arm may be arranged at the side portion of the sliding shaft member in the vehicle-width direction.

The sliding shaft member may be arranged on the rear side of the vertical axis that passes the center of a tire/wheel assembly.

The at least one links may include a second link. The first link may be coupled with the carrier at the front end, and coupled with the arm at the rear end. The second link may be apart from the first link in the vertical or substantially vertical direction, and may be connected to the carrier at the front end, and coupled with the arm at the rear end. The span length between the coupling point at which the first link is coupled with the arm and the coupling point at which the second link is coupled with the arm may be shorter than the span length between the coupling point at which the first link is coupled with the carrier and the coupling point at which the second link is coupled with the carrier.

The sliding member may be connected to the arm at two connection portions that are apart from each other in the vertical or substantially vertical direction.

The line extending in the axial direction of the sliding shaft member and the line connecting the two connection portions at which the sliding member is connected to the arm may be non-parallel and non-coplanar.

The sliding member may have the upper portion and the lower portion that are apart from each other in the vertical or substantially vertical direction, and each of the upper portion and the lower portion may be pivotably connected to the arm.

According to the invention, the main portions of the suspension components can be arranged in the wheel.

BRIEF DESCRIPTION OF THE DRAWINGS

The forgoing and further objects, features and advantages of the invention will become apparent from the following description of example embodiments with reference to the accompanying drawings, wherein the same or corresponding portions will be denoted by the same reference numerals and wherein.

DETAILED DESCRIPTION OF THE EXAMPLE EMBODIMENTS

Hereafter, example embodiments of the invention will be described in detail with reference to accompanying drawings.

Figure 1:
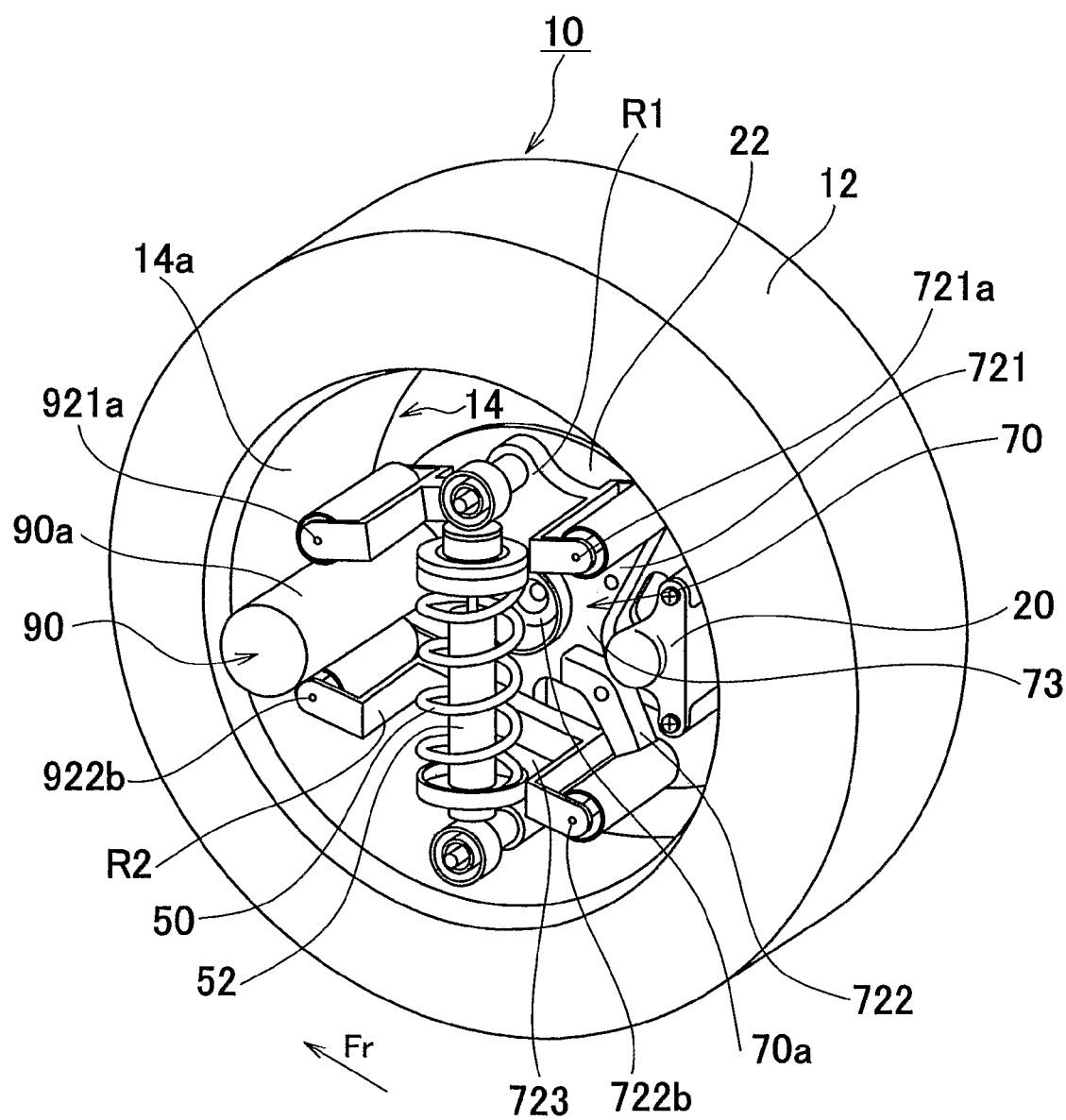
FIG. 1 illustrates the perspective view of a tire/wheel assembly 10, showing the structure of main portions of an in-wheel suspension according to a first embodiment of the invention.

FIG. 1 illustrates the perspective view of a tire/wheel assembly 10 viewed from the inside of a vehicle, showing the structure of the main portions of an in-wheel suspension according to a first embodiment of the invention. In FIG. 1, the left side is the front of the vehicle. In the description below, the in-wheel suspension according to the first embodiment is applied to a rear wheel. However, the in-wheel suspension according to the first embodiment may be applied to a front wheel.

The tire/wheel assembly 10 includes a tire 12 and a wheel 14. As described below in detail, the main portions of suspension components are arranged in a space defined by an inner peripheral surface 14a of the rim of the wheel 14. The term "in the wheel" corresponds to the term "in the substantially cylindrical space defined by the inner peripheral surface 14a of the rim of the wheel 14". However, the description that a component is arranged in the wheel does not always mean that the entirety of the component is arranged in the wheel. The description includes the structure where the component partially protrudes from the wheel.

A carrier 70 is arranged in the wheel. The carrier 70 rotatably supports the tire/wheel assembly 10 via an axle bearing 70a. The carrier 70 according to the first embodiment has two arm portions (carrier arms) 721, 722, one of which extends upward from a position near the wheel center toward the rear of the vehicle, and the other of which extends downward from a position near the wheel center toward the rear of the vehicle. In addition, the carrier 70 has another arm portion 723 which extends downward. Link pivot support shafts 721a, 722b are arranged at the ends of the two arm portions 721, 722, respectively. The lower end of an absorber 52 (more specifically, the lower end of a shell of the absorber 52) is fitted to the end of the arm portion 723 that extends downward.

A brake caliper 20 is arranged between the two arm portions, namely, at a junction portion 73 of the arm portion 721 and the arm portion 722. The brake caliper 20 is fitted to the junction portion 73 from the outside of the vehicle. The brake caliper 20 and a brake rotor 22, which is arranged outboard of the carrier 70, constitute a brake device that restricts rotation of the tire/wheel assembly 10. The junction portion 73 is a portion between the axle bearing 70a and the root portion of the two arm portions 721, 722. The strength/rigidity of the junction portion 73 is relatively high. Accordingly, using the junction portion 73 having such high strength/rigidity as the portion, to which the brake caliper 20 is fitted, ensures required strength against force applied when a brake is applied. Also, the brake caliper 20 is fitted to the carrier 70 with greater rigidity, reducing a brake squeak. In addition, various sizes of brake calipers 20 can be employed by changing the shape of the carrier 70 based on the size of the employed brake caliper 20.

An end portion 90a of an arm 90 extends into the wheel. The arm 90 is a rod-like member that extends in the vehicle-width direction. The other end portion (not shown) of the arm 90, namely, the end portion that is on the opposite side of the end portion 90a is connected to the vehicle. In the first embodiment, the other end portion of the arm 90 is strongly coupled with a vehicle body (for example, a suspension member). However, the other end portion of the arm 90 may be coupled with the vehicle body via, for example, a bushing. In the example shown in FIG. 1, the other end portion of the arm 90 is a rod-like member having a substantially circular cross-section. However, the other end portion of the arm 90 may have any cross sections and shapes as long as required rigidity/strength is ensured. Two arm portions (that cannot be seen in FIG. 1) extend from the end portion 90a of the arm 90. One of the two arm portions extends upward, and the other arm portion extends downward. Link pivot support shafts 921a, 922b are arranged at the ends of the two arm portions, respectively.

Two links (a first link R1, a second link R2), which extend in the longitudinal direction of the vehicle, are provided between the arm 90 and the carrier 70. The first link R1 and the second link R2 are coupled with each of the arm 90 and the carrier 70 so as to be pivotable about the axes (extending in the vehicle-width direction) that extend in parallel with the rotational axis of the wheel. More specifically, the front ends of the first link R1 and the second link R2 are supported at the link pivot support shafts 921a, 922b on the arm side, respectively, such that the first link R1 and the second link R2 can pivot with respect to the arm 90. Similarly, the rear ends of the first link R1 and the second link R2 are supported at the link pivot support shafts 721a, 722b on the carrier side, respectively, such that the first link R1 and the second link R2 can pivot with respect to the carrier 70. The first link R1 and the second link R2 may be supported so as to be substantially freely pivotable with respect to the carrier 70 (using, for example, a ball joint). Alternatively, the first link R1 and the second link R2 may be supported so as to be pivotable with respect to the carrier 70 using an elastic member (for example, a bushing). Also, the first link R1 and the second link R2 may be supported so as to be pivotable with respect to the carrier 70 using a pin.

Thus, the tire/wheel assembly 10 is supported so as to be movable in the vertical/substantially vertical direction with respect to the arm 90 (actually, with respect to the vehicle body) using the first link R1 and the second link R2. Namely, the suspension according to the first embodiment is restrained with a certain degree of freedom in the movement in the vertical/substantially vertical direction.

A spring (coil spring) 50 and the absorber 52 are arranged in the wheel. More specifically, the upper end of the spring 50/absorber 52 (the upper end of a rod) is fitted to the first link R1. The lower end of the spring 50/absorber 52 (the lower end of a shell) is fitted to the carrier. Namely, the upper end of the spring 50/absorber 52 is fitted to the first link R1, and the lower end thereof is fitted to the arm portion 723 that extends to a position below the second link R2. The first link R1 and the second link R2 are arranged in the wheel in the longitudinal direction of the vehicle, at positions close to the outside of the vehicle. With this arrangement, the spring 50/absorber 52 can be provided in the wheel. Only fitting portions of the first link R1 and the second link R2, which are fitted to the link pivot support shafts 721a, 921a, 722, 922b extend in the vehicle-width direction in the wheel. Thus, the load point of the spring 50/absorber 52 is present within the wheel.

In FIG. 1, the spring 50 is arranged between a lower spring seat and an upper spring seat so as to surround the absorber 52. The spring 50 and the absorber 52 extend and contract coaxially with each other in the vertical/substantially vertical direction. However, the spring 50 and the absorber 52 need not be arranged coaxially with each other. Also, either a spring coil or an air spring may be employed as the spring 50. The absorber 52 may be either a hydraulic absorber that attenuates a shock input in the vertical/substantially vertical direction or a rotary electromagnetic absorber that attenuates a shock input in the rotational direction.

With this arrangement, when the tire/wheel assembly 10 moves in the vertical/substantially vertical direction (when the tire/wheel assembly 10 jounces/rebounds), the first link R1 pivots about the link pivot support shaft 721a on the carrier side, when relatively viewed from the carrier side. In accordance with this pivot motion, the spring 50/absorber 52 extends and contracts. As a result, a shock given to the vehicle body from the road surface is attenuated.

With the structure according to the first embodiment described above, the main portions of the suspension components can be arranged in the wheel using the links (R1, R2) that are low in cost and highly reliable (without using a sliding mechanism). This makes it possible to provide the in-wheel suspension having the structure that can be obtained at low cost. Also, the offset distance between the tire input point and each member in the vehicle-width direction is reduced by arranging the main portions of the suspension components in the wheel. As a result, required strength/rigidity of each member can be reduced, thereby reducing the weight of the in-wheel suspension.

According to the first embodiment, because the link coupling portions (the link pivot support shafts 721a, 722b, 921a, 922b) are arranged in the wheel, a moment, which acts to change the toe-angle and which is applied to the links R1, R2 and the link coupling portions, is considerably small with respect to longitudinal force applied to the tire. Thus, the toe-angle changes by a small amount with respect to longitudinal force applied to the tire. As a result, stability of the vehicle when the brake is applied can be enhanced.

According to the first embodiment, the offset distance between the tire load point and the spring 50/absorber 52 in the vehicle-width direction is considerably small, and the moment, which acts to change the camber angle due to the vehicle weight, is small. Accordingly, the required strength of the links R1, R2 and the link coupling portions can be reduced, thereby further reducing the weight of the in-wheel suspension.

In the first embodiment, the center portions of the first link R1 and the second link R2 are arranged outboard of the link pivot support shafts 721a, 722b, 921a, 922b, whereby the spring 50/absorber 52 can be provided in the wheel. However, if the offset distance between the center portions of the first link R1 and the second link R2 and the link pivot support shafts 721a, 722b, 921a, 922b is not sufficient, the spring 50/absorber 52 may partially protrudes from the wheel in the vehicle-width direction. Alternatively, the center portion(s) of the first link R1 and/or the second link R2 may be arranged inboard of the link pivot support shafts 721a, 722b, 921a, 922b. Thus, the spring 50/absorber 52 can be arranged between the first link R1 the second link R2 and the carrier 70 in the vehicle-width direction.

According to the first embodiment described above, using the first link R1 and the second link R2 makes the stroke of the spring 50/absorber 52 small with respect to the stroke of the tire/wheel assembly 10 in the vertical/substantially vertical direction. Therefore, the spring 50/absorber 52 can extends and contracts by a required amount even in the wheel having a limited space (the stroke of the spring 50/absorber 52 is within the diameter of the wheel rim). In addition, an inexpensive hydraulic absorber can be used instead of a relatively expensive rotary electromagnetic absorber described later.

Figure 2:
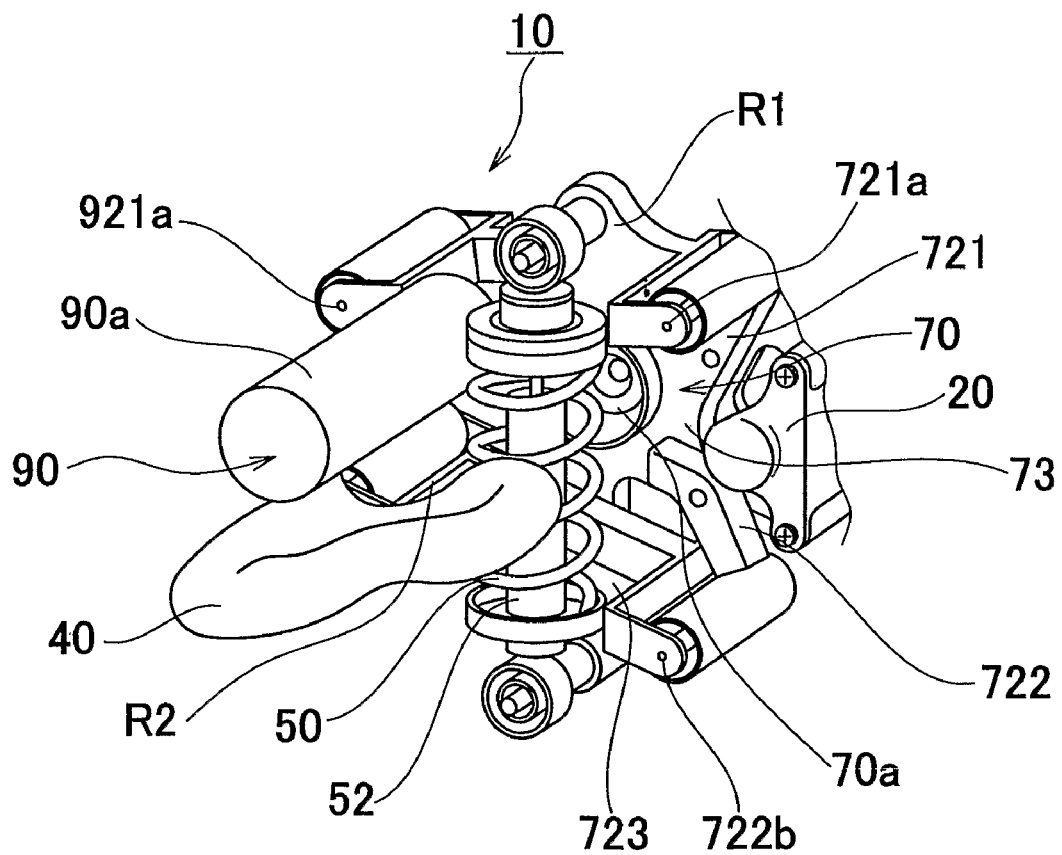
FIG. 2 illustrates the perspective view showing the manner in which a cooling plate 40 is arranged.

According to the first embodiment, as shown in FIG. 1, the arm 90 is arranged on the front side of the spring 50/absorber 52. Accordingly, the arm 90 can protect the spring 50 from road debris such as a pebble. In addition, as shown in FIG. 2, a cooling plate 40, which cools the absorber 52 by supplying air thereto and which protects the spring 50 from road debris such as a pebble, may be provided in the space close to the front of the tire/wheel assembly 10. Thus, durability of the spring 50 can be enhanced because the arm 90 and the cooling plate 40 protect the spring 50 from road debris such as a pebble. In addition, durability of the absorber 52 can be enhanced by suppressing an increase in the hydraulic pressure in the absorber 52 because the absorber 52 is cooled by the cooling plate 40.

In the first embodiment, the lower end of the spring 50/absorber 52 is fitted to the carrier 70, and the upper end of the spring 50/absorber 52 is fitted to the first link R1. Alternatively, the lower end of the spring 50/absorber 52 may be fitted to the second link R2, and the upper end of the spring 50/absorber 52 may be fitted to the carrier 70.

In the first embodiment, the first link R1 and the second link R2 may be parallel to each other. However, the first link R1 and the second link R2 need not be parallel to each other. Also, the first link R1 and the second link R2 may be equal in length. Alternatively, the first link R1 and the second link R2 may be different in length.

Figure 3:
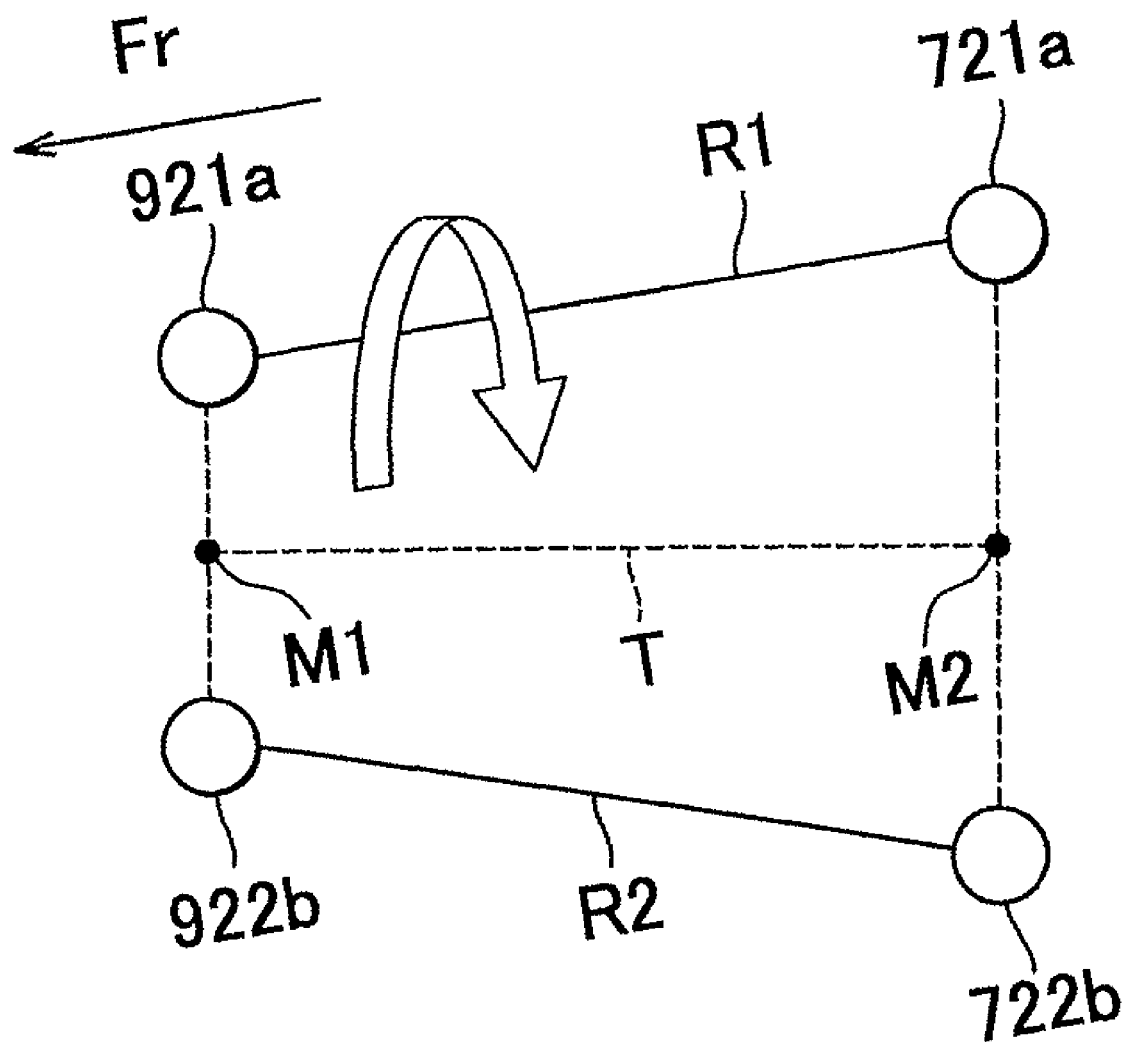
FIG. 3 illustrates the side view schematically showing main portions of the tire/wheel assembly 10 according to the first embodiment.

FIG. 3 illustrates the side view schematically showing the main portions of the in-wheel suspension in FIG. 1. In FIG. 3 as well, the left side is the front of the vehicle. In the first embodiment, the line T connecting the midpoint M1 between the link pivot support shafts 921a, 922b to the midpoint M2 between the link pivot support shafts 721a, 722b tilts upward toward the front of the vehicle, as schematically shown in FIG. 3. With this structure, when a lateral force is applied to the tire contact point, the links R1, R2 move so as to rotate on the line T that tilts upward toward the front of the vehicle, as shown by the arrow in FIG. 3, whereby the orientation of the tire/wheel assembly 10 changes such that the toe-in-angle increases. Thus, the lateral steering force that is generated when a lateral force is applied to the tire contact point acts to understeer Accordingly, with the in-wheel suspension according to the first embodiment, appropriate steering characteristics can be achieved.

Figure 4:
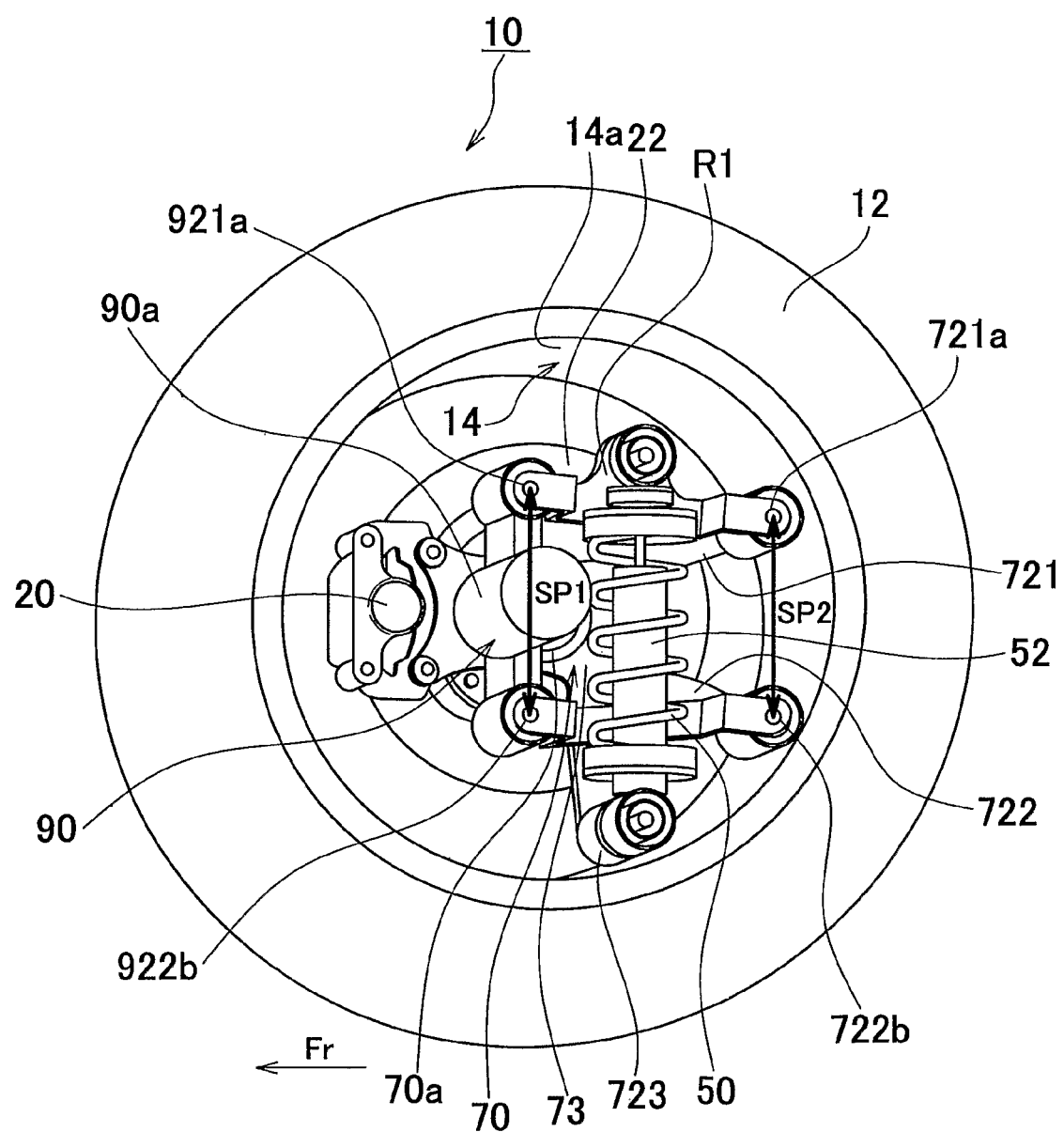
FIG. 4 illustrates the perspective view of the tire/wheel assembly 10, showing the structure of main portions of an in-wheel suspension according to a second embodiment of the invention.

FIG. 4 illustrates the perspective view of the tire/wheel assembly 10 viewed from the inside of the vehicle, showing the structure of the main portions of an in-wheel suspension according to a second embodiment of the invention. In FIG. 4, the left side is the front of the vehicle. In the description below, the in-wheel suspension according to the second embodiment is applied to a rear wheel. However, the in-wheel suspension according to the second embodiment may be applied to a front wheel. The same or corresponding portions as/to those in the first embodiment will be denoted by the same reference numerals, and only the structure specific to the second embodiment will be described below.

In the second embodiment shown in FIG. 4, the brake caliper 20 is arranged in the wheel at a position close to the front of the vehicle. The coupling points, at which the arm 90 is coupled with the first link R1 and the second link R2 (the link pivot support shafts 921a, 922b), are arranged on the rear side of the brake caliper 20.

Figure 5:
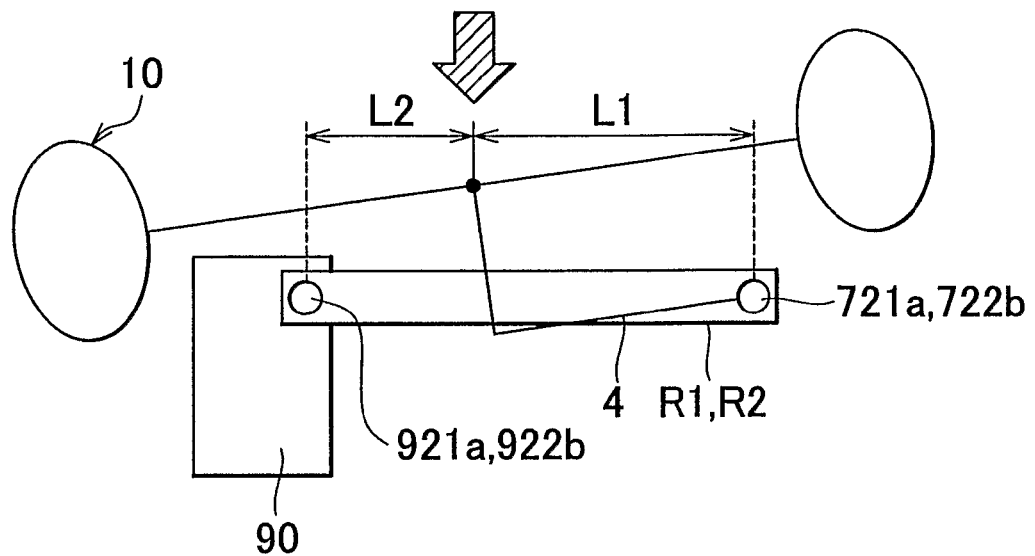
FIG. 5 illustrates the plan view schematically showing the main portions of the tire/wheel assembly 10.

FIG. 5 illustrates the plan view schematically showing the main portions of the tire/wheel assembly 10 according to the second embodiment. In FIG. 5 as well, the left side is the front of the vehicle (accordingly, the tire/wheel assembly 10 in FIG. 5 is the right rear wheel).

As shown in FIGS. 4 and 5, in the second embodiment, the coupling points at which the first link R1 and the second link R2 are coupled with the carrier 70 (the link pivot support shafts 721a, 722b) are arranged on the rear side of the wheel center. Also, the coupling points at which the first link R1 and the second link R2 are coupled with the arm 90 (the link pivot support shafts 921a, 922b) are arranged on the front side of the wheel center. In this case, as shown in FIG. 5, when a lateral force is applied to the tire contact point (more specifically, the tire contact point is slightly deviated from the wheel center toward the rear of the vehicle) as indicated by the arrow, a moment for increasing the toe-in-angle of the tire/ wheel assembly 10 is generated because the link pivot support shafts 721a, 722b are arranged at positions each deviated from the wheel center by the length L1. Meanwhile, a moment for increasing the toe-out-angle of the tire/wheel assembly 10 is generated because the link pivot support shafts 921a, 922b are arranged at positions each deviated from the wheel center by the length L2. Accordingly, when the coupling points have the same rigidity, if the length L1 is set to be longer than the length L2, a moment for increasing the toe-in-angle of the tire/wheel assembly 10 can be generated as the whole tire/wheel assembly 10, when the lateral force is applied to the tire contact point (namely, the lateral steering force acts to understeer). In addition to the positional relationship between each coupling point described above and the wheel center, the rigidity of each coupling point (characteristics of a bushing, etc.) may be appropriately adjusted such that a moment for increasing the toe-in-angle of the tire/wheel assembly 10 is generated when a lateral force is applied to the tire contact point.

In the second embodiment, an additional space is obtained in the wheel on the rear side of the wheel center by arranging the brake caliper 20 in the wheel on the front side of the wheel center. As a result, the link pivot support shafts 721a, 722b can be arranged on the rear side of the wheel center more easily. Also, as in the first embodiment, even in the structure where the brake caliper 20 is arranged in the wheel on the rear side of the wheel center, a moment for increasing the toe-in-angle of the tire/wheel assembly 10 can be generated, for example, by arranging the link pivot support shafts 721a, 722b on the rear side of the wheel center.

Figure 6:
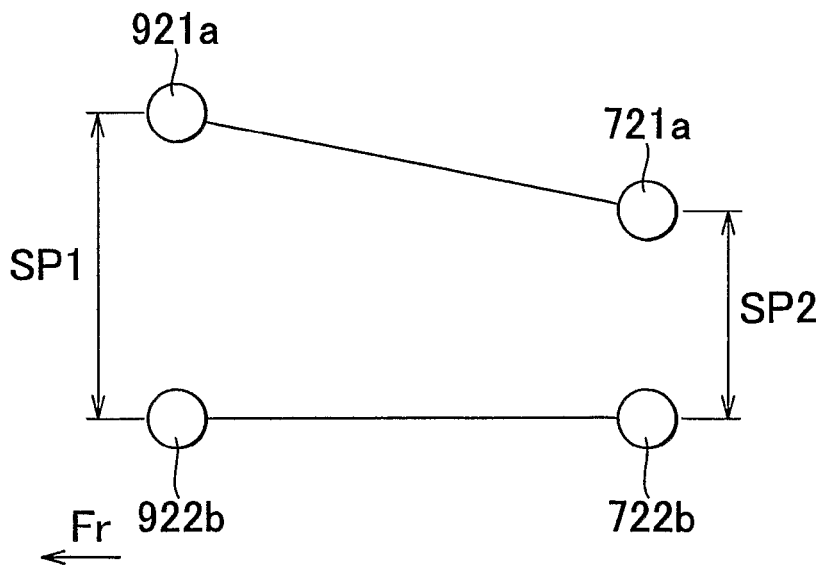
FIG. 6 illustrates the side view schematically showing the main portions of the tire/wheel assembly 10 according to the second embodiment.

FIG. 6 illustrates the side view schematically showing the main portions of the tire/wheel assembly 10 according to the second embodiment. In FIG. 6 as well, the left side is the front of the vehicle.

As shown in FIGS. 4 and 6, in the second embodiment, the span length between the coupling points at which the first link R1 and the second link R2 are coupled with the arm 90 is set to be longer than the span length between the coupling points at which the first link R1 and the second link R2 are coupled with the carrier 70. Namely, the span length SP1 between the link pivot support shafts 921a, 922b is set to be longer than the span length SP2 between the link pivot support shafts 721a, 722b. Thus, it is possible to reduce the amount of longitudinal movement (curvature) of the tire/wheel assembly 10 due to the vertical/substantially vertical movement of the tire/wheel assembly 10. As a result, the length of each of the first link R1 and the second link R2 can be reduced. Thus, the weight and size of the in-wheel suspension can be reduced, while the rigidity thereof can be enhanced.

With the structure according to the second embodiment described above, the main portions of the suspension components can be arranged in the wheel using the inexpensive and reliable links R1, R2 (without using a sliding mechanism). Thus, it is possible to provide the in-wheel suspension having the structure obtained at low cost. Also, because the main portions of the suspension components are arranged in the wheel, the offset distance between the tire input point and each member in the vehicle-width direction is reduced. As a result, the required strength/rigidity of each member can be reduced, thereby reducing the weight of the in-wheel suspension.

Also, according to the second embodiment, the link coupling portions (the link pivot support shafts 721a, 722b, 921a, 922b) are arranged in the wheel. Therefore, the moment for changing the toe-angle, which is applied to the links R1, R2 and the link coupling portions and which is generated in response to the input in the tire in the longitudinal direction, is considerably small, and a change in the toe-angle in response to the longitudinal force is small. Accordingly, stability of the vehicle when the brake is applied can be enhanced.

Also, according to the second embodiment, the offset distance between the tire load point and the spring 50/absorber 52 in the vehicle-width direction is considerably small, and the moment for changing the camber angle due to the vehicle weight is small. Accordingly, the required strength of the links R1, R2 and the link coupling portions can be reduced, further reducing the weight of the in-wheel suspension.

In the second embodiment, the center portion of the first link R1 is arranged outboard of the link pivot support shafts 721a, 921a, and the center portion of the second link R2 is arranged outboard of the link pivot support shafts 722b, 922b, whereby the spring 50/absorber 52 can be arranged in the wheel. However, if the offset distance is not sufficient, the spring 50/absorber 52 may partially protrude from the wheel in the vehicle-width direction. Instead of the structure described above, the center portion of the first link R1 may be arranged inboard of the link pivot support shafts 721a, 921a, and the center portion of the second link R2 may be arranged inboard of the link pivot support shafts 722b, 922b, whereby the spring 50/absorber 52 is arranged between the first link R1/the second link R2 and the carrier 70 in the vehicle-width direction.

According to the second embodiment described above, the stroke of the spring 50/absorber 52 can be made small with respect to the stroke of the tire/wheel assembly 10 (the stroke in the vertical/substantially vertical direction) using the first link R1 and the second link R2. Accordingly, the spring 50/absorber 52 can extend and contract by an adequate amount even in the wheel having a limited space. Also, an inexpensive hydraulic absorber can be used instead of a relatively expensive rotary electromagnetic absorber described above.

According to the second embodiment, because the arm 90 is arranged on the front side of the spring 50/absorber 52, the arm 90 can protect the spring 50 from road debris such as a pebble. As described above with reference to FIG. 2, the cooling plate 40 that cools the absorber 52 by supplying air thereto and that protects the absorber 52 from road debris such as a pebble may be provided.

Figure 7:
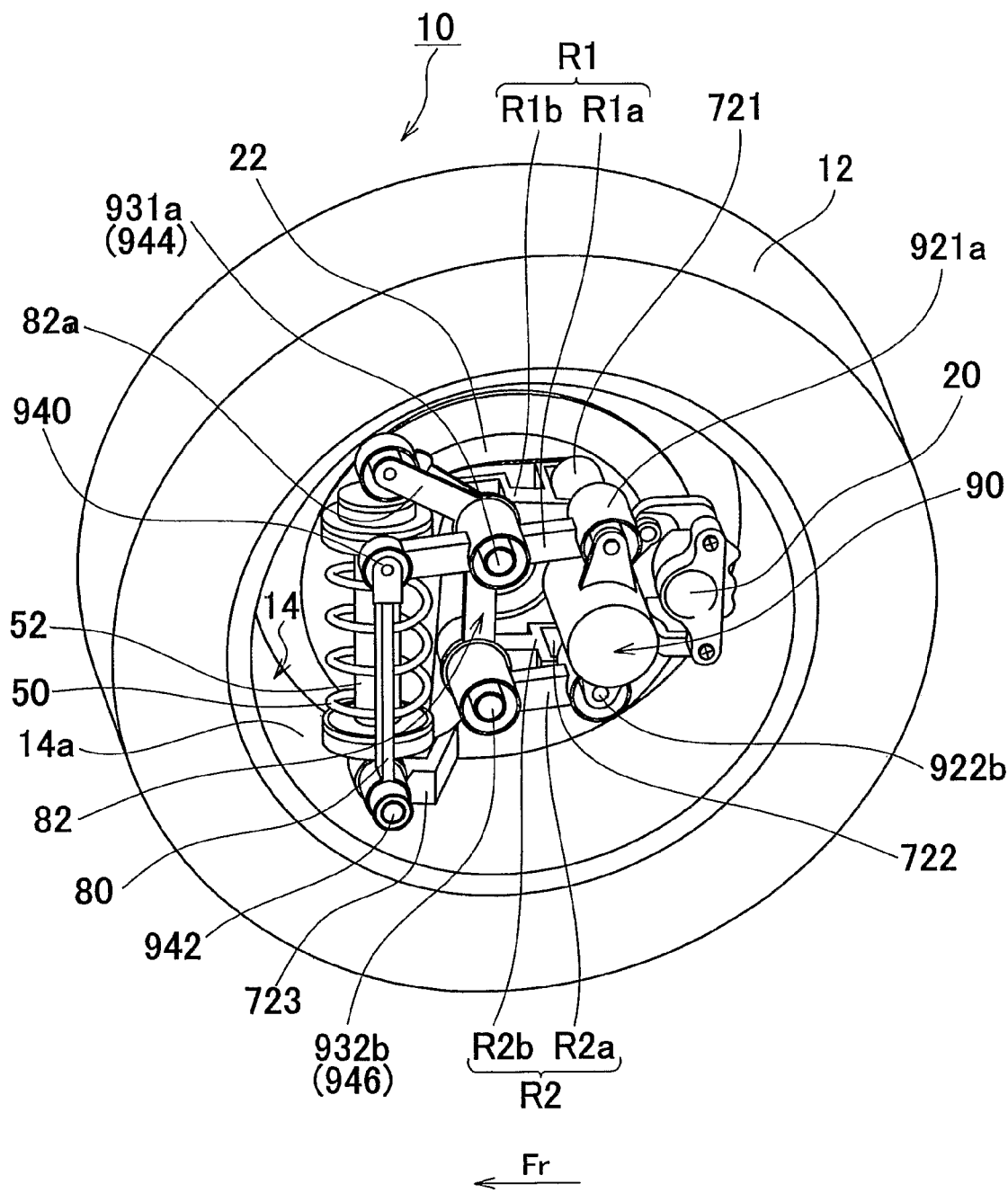
FIG. 7 illustrates the perspective view of the tire/wheel assembly 10, showing the structure of main portions of an in-wheel suspension according to a third embodiment of the invention.

FIG. 7 illustrates the perspective view of the tire/wheel assembly 10 viewed from the inside of the vehicle, showing the structure of the main portions of an in-wheel suspension according to a third embodiment of the invention. In FIG. 7, the left side is the front of the vehicle. In the description below, the in-wheel suspension according to the third embodiment is applied to a rear wheel. However, the in-wheel suspension according to the third embodiment may be applied to a front wheel. The same or corresponding portions as/to those in the first embodiment will be denoted by the same reference numerals. Only the portions specific to the third embodiment will be described below. In the third embodiment, multiple links are arranged in parallel in the vehicle-width direction. Accordingly, the third embodiment will be described also using the schematic view in FIG. 8.

In the third embodiment, the first link R1 includes an arm-side link R1a that is pivotable about the link pivot support shaft 921a of the arm 90; and a carrier-side link R1b that is pivotable about the link pivot support shaft 721a (not seen in FIG. 7. See FIG. 8) of the carrier 70. These two links R1a, R1b are pivotably coupled with each other by a pivot support shaft 931a. These two links R1a, R1b may be supported by the pivot support shaft 931a so as to be pivotable about the axis substantially parallel to the wheel rotation axis. These two links R1a, R1b may be supported so as to be substantially freely pivotable (using, for example, a ball joint). Alternatively, these two links R1a, R1b may be supported so as to be pivotable using an elastic member (for example, a bushing).

In the example shown in FIG. 7, the carrier-side link R1b is substantially parallel to the arm-side link R1a. The carrier-side link R1b is arranged outboard of the arm-side link R1a. The carrier-side link R1b is arranged so as to extend from the pivot support shaft 931a toward the rear of the vehicle. Accordingly, the pivot support shaft 721a (the end of the arm portion 721 of the carrier 70) is arranged outboard of the link pivot support shaft 921a.

Similarly, the second link R2 includes an arm-side link R2a that is pivotable about the link pivot support shaft 922b of the arm 90; and a carrier-side link R2b that is pivotable about the link pivot support shaft 722b (not seen in FIG. 7. See FIG. 8) of the carrier 70. These two links R2a, R2b are pivotably coupled with each other by the pivot support shaft 932b. These two links R2a, R2b are supported so as to be pivotable about the axis substantially parallel to the wheel rotation axis. These two links R2a, R2b may be supported so as to be substantially freely pivotable (using, for example, a ball joint). Alternatively, these two links R2a, R2b may be supported so as to be pivotable using an elastic member (for example, a bushing).

Similarly, in the example shown in FIG. 7, the carrier-side link R2b is substantially parallel to the arm-side link R2a. The carrier-side link R2b is arranged outboard of the arm-side link R2a. The carrier-side link R2b is arranged so as to extend from the pivot support shaft 932b toward the rear of the vehicle. Accordingly, the pivot support shaft 722b (the end of the arm portion 722 of the carrier 70) is arranged outboard of the link pivot support shaft 922b.

The first link R1 is coupled with the carrier 70 by a first restraining link 80. In the example shown in FIG. 7, the arm-side link R1a of the first link R1 extends toward the front of the vehicle beyond the pivot support shaft 931a. One end of the first restraining link 80 is pivotably supported by a pivot support shaft 940 arranged at the end of the arm-side link R1a. The other end of the first restraining link 80 is pivotably supported by the carrier 70 via a pivot support shaft 942. The first restraining link 80 is supported by the pivot support shafts 940, 942 so as to be pivotable about the axis substantially parallel to the wheel rotation axis. The first restraining link 80 may be supported by the pivot support shafts 940, 942 so as to be substantially freely pivotable (using, for example, a ball-joint), or so as to be pivotable via an elastic member (for example, a bushing).

The first link R1 and the second link R2 are coupled with each other via a second restraining link 82. More specifically, the second restraining link 82 is coupled with the arm-side link R1a of the first link R1 via a pivot support shaft 944. The second restraining link 82 is coupled with the arm-side link R2a of the second link R2 via a pivot support shaft 946. The second restraining link 82 is supported by the pivot support shafts 944, 946 so as to be pivotable about the axis substantially parallel to the wheel rotation axis. The second restraining link 82 may be supported by the pivot support shafts 944, 946 so as to be substantially freely pivotable (using, for example, a ball-joint), or so as to be pivotable via an elastic member (for example, a bushing). As shown in FIG. 7, the pivot support shafts 944, 946 may be coaxial with the pivot support shafts 931a, 932b, respectively. In this case, one pivot support shaft may serve as both the pivot support shafts 931a and 944, and another pivot support shaft may serve as both the pivot support shafts 932b and 946. As a result, only two pivot support shafts are required.

Figure 9:
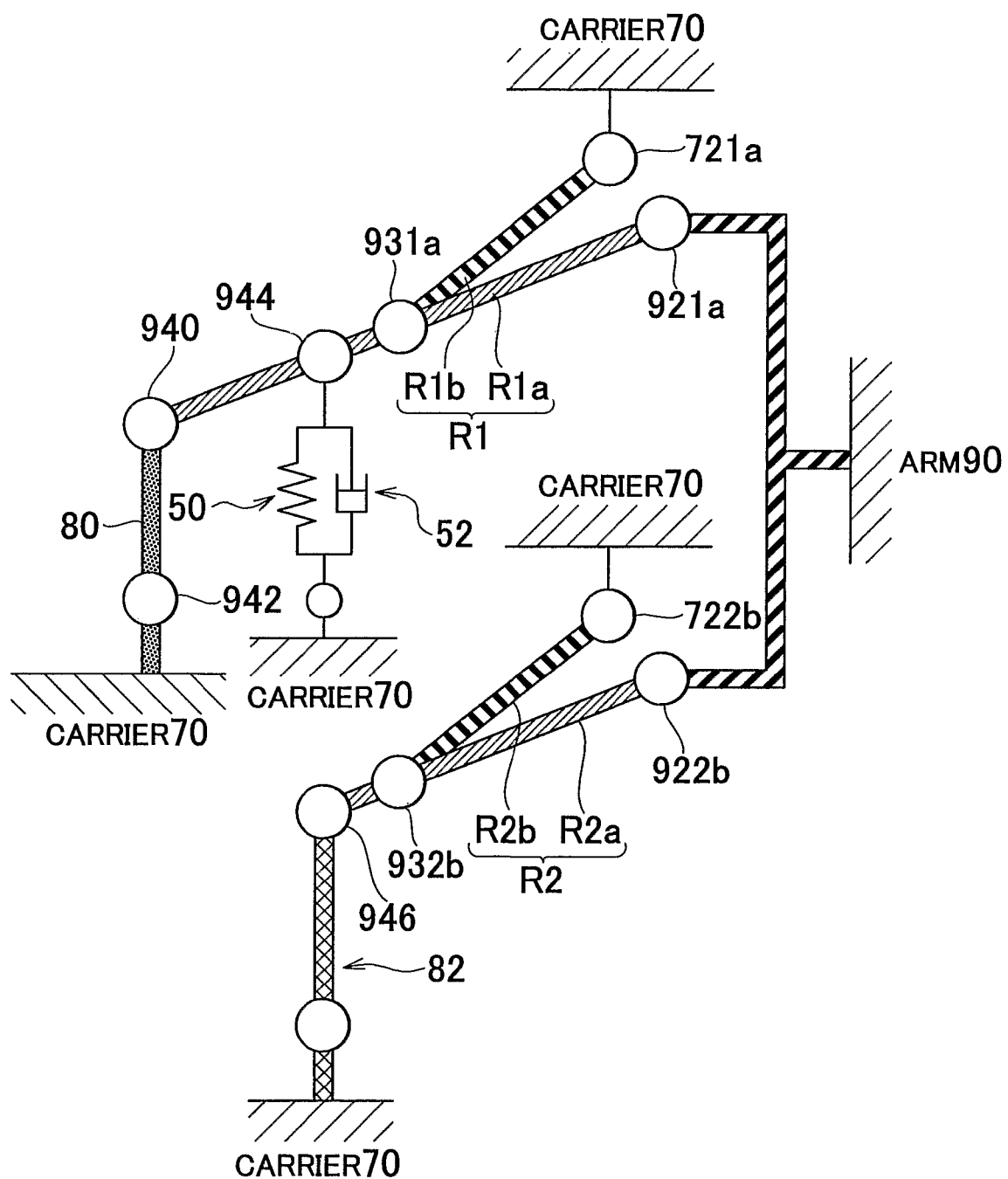
FIG. 9 illustrates the view schematically showing the structure of the main portions of an in-wheel suspension according to a modified example of the third embodiment.

Thus, the tire/wheel assembly 10 is supported so as to be movable in the vertical/substantially vertical direction with respect to the arm 90 (with respect to the vehicle body) using the first link R1, the second link R2 and the restraining links 80, 82. Namely, the suspension according to the third embodiment is constrained with a certain degree of freedom in the vertical/substantially vertical movement. In the third embodiment, the first link R1 is coupled with the carrier 70 by the first restraining link 80, and the first link R1 and the second link R2 are coupled with each other by the second restraining link 82, whereby the suspension is constrained with a certain degree of freedom in the vertical/substantially vertical movement. However, as shown in FIG. 9, the first link R1 may be coupled with the carrier 70 by the first restraining link 80, and the second link R2 may be coupled with the carrier 70 by the second restraining link 82, whereby the suspension is constraint with a certain degree of freedom the in the vertical/substantially vertical direction.

In the third embodiment as well, the spring 50/absorber 52 is arranged in the wheel. The spring 50/absorber 52 is arranged between the second restraining link 82 and the carrier 70. More specifically, as shown in FIG. 7, the second restraining link 82 has an extension portion 82a that extends from the pivot support shaft 944 upward toward the front of the vehicle. The upper end of the spring 50/absorber 52 (the upper end of the rod) is fitted to the end of the extension portion 82a. The lower end of the spring 50/absorber 52 (the lower end of the shell) is fitted to the end of the arm portion 723 that obliquely extends from the carrier 70 toward the front of the vehicle. As shown in FIG. 7, the fitting portion for the restraining link 80, namely, the pivot support shaft 942 is fitted to the end of the arm portion 723. Conventionally, two carrier arms are needed as the fitting portion. However, according to the third embodiment, the number of the carrier arms is reduced to one. As a result, the weight of the carrier 70 can be reduced. The spring 50 and the absorber 52 need not be arranged coaxially with each other. Also, either a spring coil or an air spring may be used as the spring 50. The absorber 52 may be either a hydraulic absorber that attenuates a shock input in the vertical/substantially vertical direction or a rotary electromagnetic absorber that attenuates a shock input in the rotational direction.

With this structure, when the tire/wheel assembly 10 moves in the vertical/substantially vertical direction (when the tire/wheel assembly 10 jounces/rebounds), the spring 50/absorber 52 extends and contracts. As a result, a shock applied to the vehicle body from the road surface is reduced. In a modified example shown in FIG. 9, the spring 50/absorber 52 is arranged between the first link R1 or the second link R2 (the first link R1 in the modified example in FIG. 9) and the carrier 70, as in the first embodiment.

With the structure according to the third embodiment described above, the main portions of the suspension components can be arranged in the wheel by using the inexpensive and reliable links R1, R2 (without using a sliding mechanism). Thus, it is possible to provide the in-wheel suspension having the structure obtained at low cost. Also, the offset distance between the tire input point and each member in the vehicle-width direction is reduced by arranging the main portions of the suspension components in the wheel. Accordingly, the required strength/rigidity of each member can be reduced, reducing the weight of the in-wheel suspension.

Figure 10A:
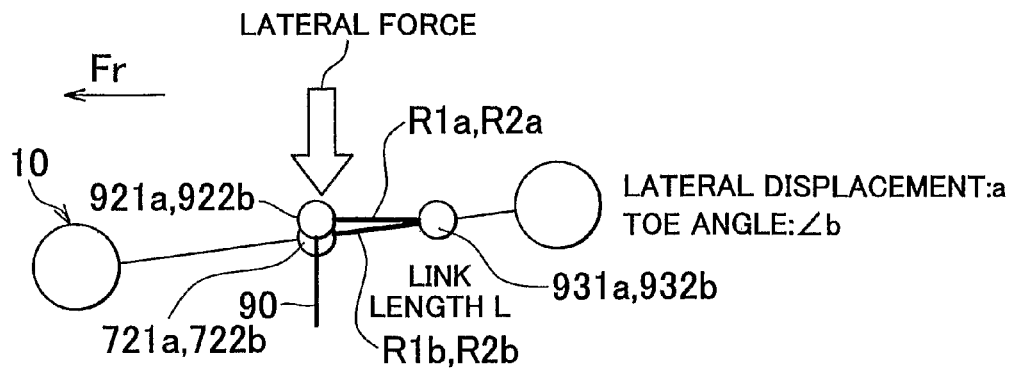
FIG. 10 illustrates the views for describing the rigidity, against lateral force, of the in-wheel suspension according to the third embodiment.
Figure 10B:
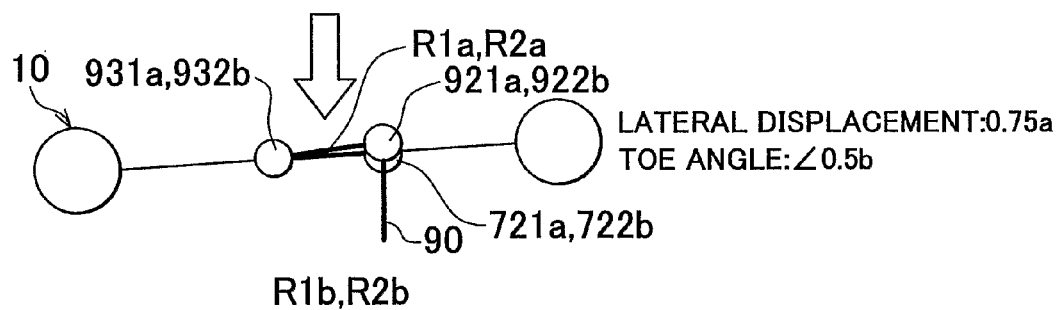
Figure 10C:
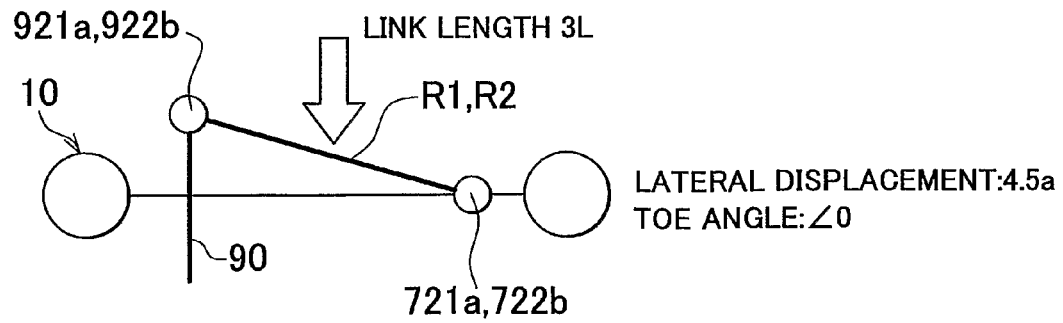

Also, with the structure according to the third embodiment, the first link R1 is formed of the two links R1a, R1b, and the second link R2 is formed of the two links R2a, R2b. Although the number of links increases, the length of each link can be reduced. Thus, the weight and size of each link can be reduced and the rigidity of each link can be enhanced. Namely, as shown in FIGS. 10A and 10B, according to the third embodiment, if the link coupling portions (link pivot support shafts 721a, 722b, 921a, 922b, etc.) have the same rigidity as that in the first embodiment and the length of each link is one thirds of that in the first embodiment shown in FIG. 10C, displacement in the vehicle-width direction in response to an input of a lateral force can be reduced, namely, rigidity against the input of the lateral force can be enhanced. FIGS. 10A and 10B illustrates structures that are different in the positions of the link pivot support shaft 921a, 922b with respect to the wheel center, and the positions of the link coupling portions 931a, 932b, from which the links R1b, R2b respectively extend, with respect to the wheel center (namely, the direction in which the links R1b, R2b extend from the link coupling portions 931a, 932b, respectively).

Similarly, according to the third embodiment, because the link coupling portions (link pivot support shafts 721a, 722b, 921a, 922b, etc.) are arranged in the wheel, the moment for changing to-angle of the tire/wheel assembly, which is applied to the links R1, R2 and the link coupling portions, is considerably small with respect to the shock input in the tire in the longitudinal direction, and a change in the toe-angle in response to the shock input of the longitudinal force is small. Accordingly, stability of the vehicle when the brake is applied can be enhanced.

According to the third embodiment, the offset distance between the tire load point and the spring 50/absorber 52 in the vehicle-width direction is considerably small, and the moment for changing the camber angle due to the vehicle weight is small. Accordingly, the required strength of the links R1, R2 and the link coupling portions can be reduced, further reducing the weight of the in-wheel suspension.

According to the third embodiment described above, the stroke of the spring 50/absorber 52 can be made small with respect to the stroke of the tire/wheel assembly 10 (the stroke in the vertical/substantially vertical direction) using the first link R1 and the second link R2. Therefore, the spring 50/absorber 52 can extends and contracts by a required amount even in the wheel having a limited space. In addition, an inexpensive hydraulic absorber can be used instead of a relatively expensive rotary electromagnetic absorber described later.

According to the third embodiment, the arm 90 is arranged on the front side of the spring 50/absorber 52. Accordingly, the arm 90 can protect the spring 50 from road debris such as a pebble. In addition, as described above with reference to FIG. 2, the cooling plate 40 that cools the absorber 52 by supplying air thereto and that protects the absorber 52 from road debris such as a pebble may be provided.

In the third embodiment, the structure of the first link R1 and the second link R2 may be different from that described above. Namely, the second link R2 may be coupled with the carrier 70 by the first restraining link 80. In this case, the first link R1 and the second link R2 may be coupled with each other by the second restraining link 82, the second restraining link 82 may be extended from the first link R1, and the spring 50/absorber 52 may be arranged between the extension portion and the carrier 70.

In the third embodiment, a length adjustment mechanism (for example, a turnbuckle) may be provided to at least one of the first link R1 and the second link R2. Thus, the vehicle height can be adjusted by adjusting the length of the link without changing the spring 50.

In the third embodiment as well as in the first embodiment, the line connecting the midpoint between the link pivot support shafts 921a, 922b to the midpoint between the link pivot support shafts 721a, 722b may be tilted upward toward the front of the vehicle, when viewed from the side of the vehicle. Thus, the lateral steering force that is generated when the lateral force is input can be made to act to understeer. In the third embodiment as well as in the second embodiment, the span length between the coupling points at which the first link R1 and the second link R2 are coupled with the arm 90 may be set to be longer than the span length between the coupling points at which the first link R1 and the second link R2 are coupled with the carrier 70.

Next, another modified example of the third embodiment will be described with reference to FIGS. 11 to 14.

Figure 11:
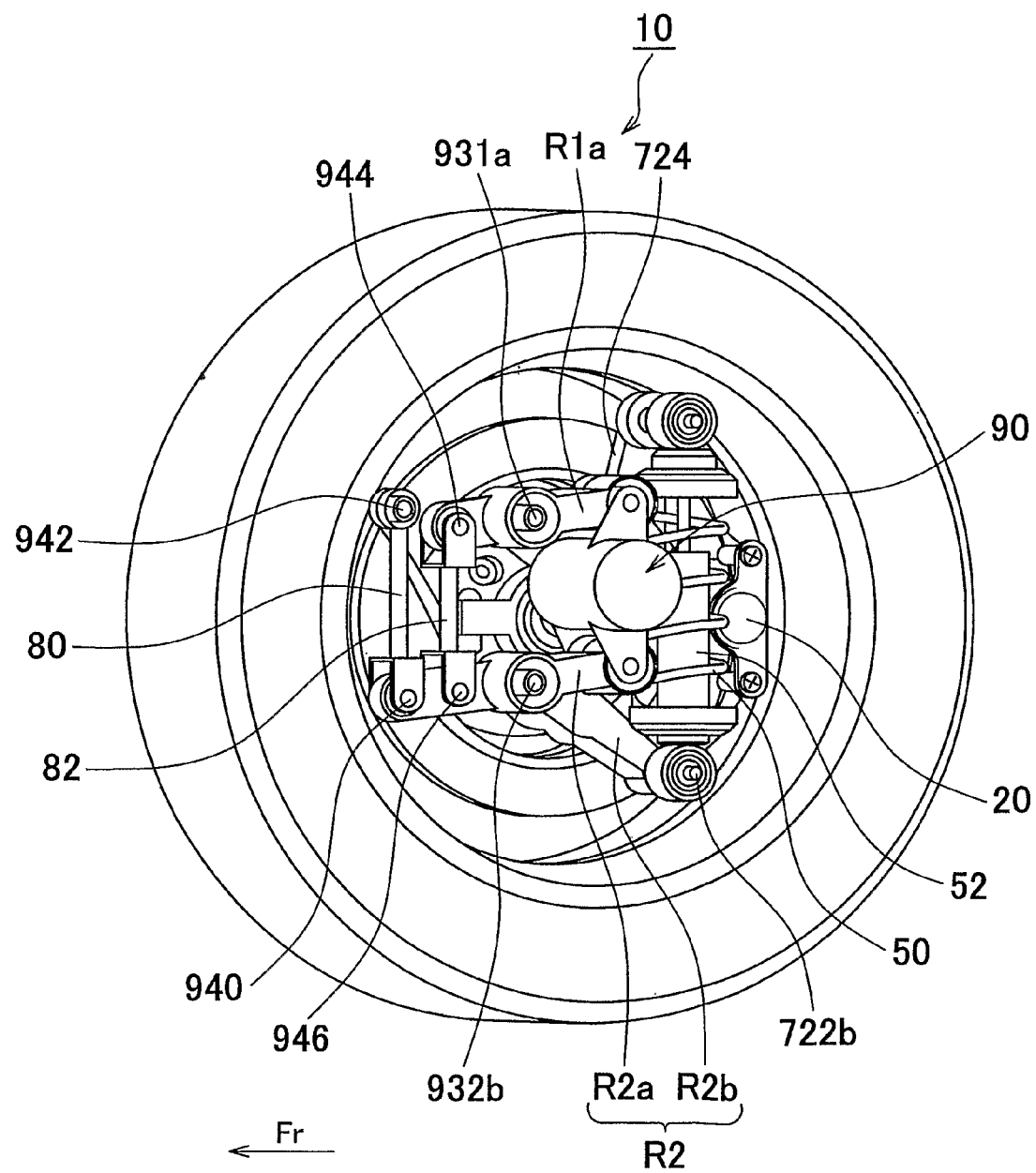
FIG. 11 illustrates the perspective view of the tire/wheel assembly 10, showing the structure of the main portions of an in-wheel suspension according to another modified example of the third embodiment.
Figure 12:
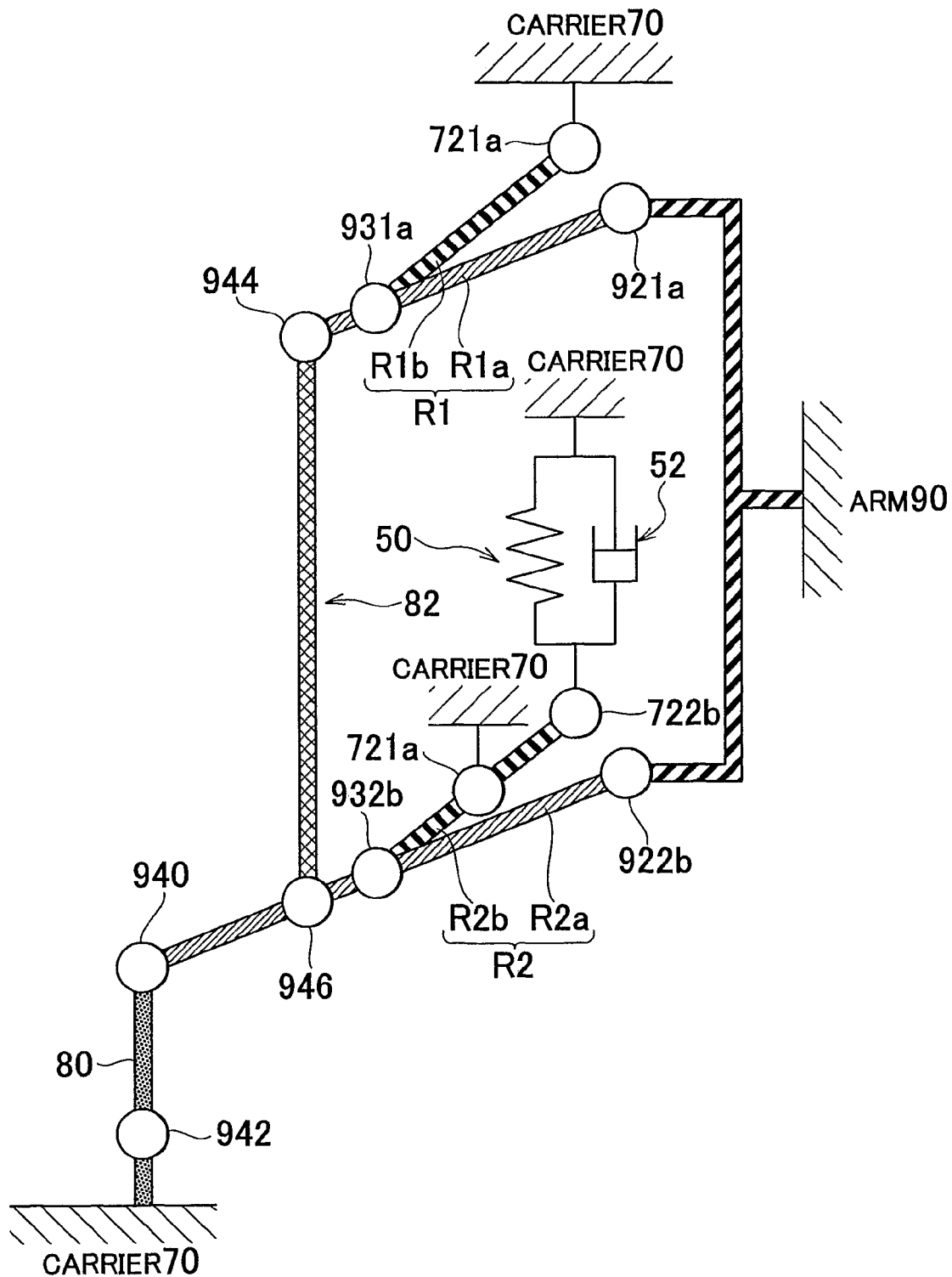
FIG. 12 illustrates the view schematically showing the structure of the main portions of the in-wheel suspension according to the modified example, shown in FIG. 11, of the third embodiment.
Figure 13:
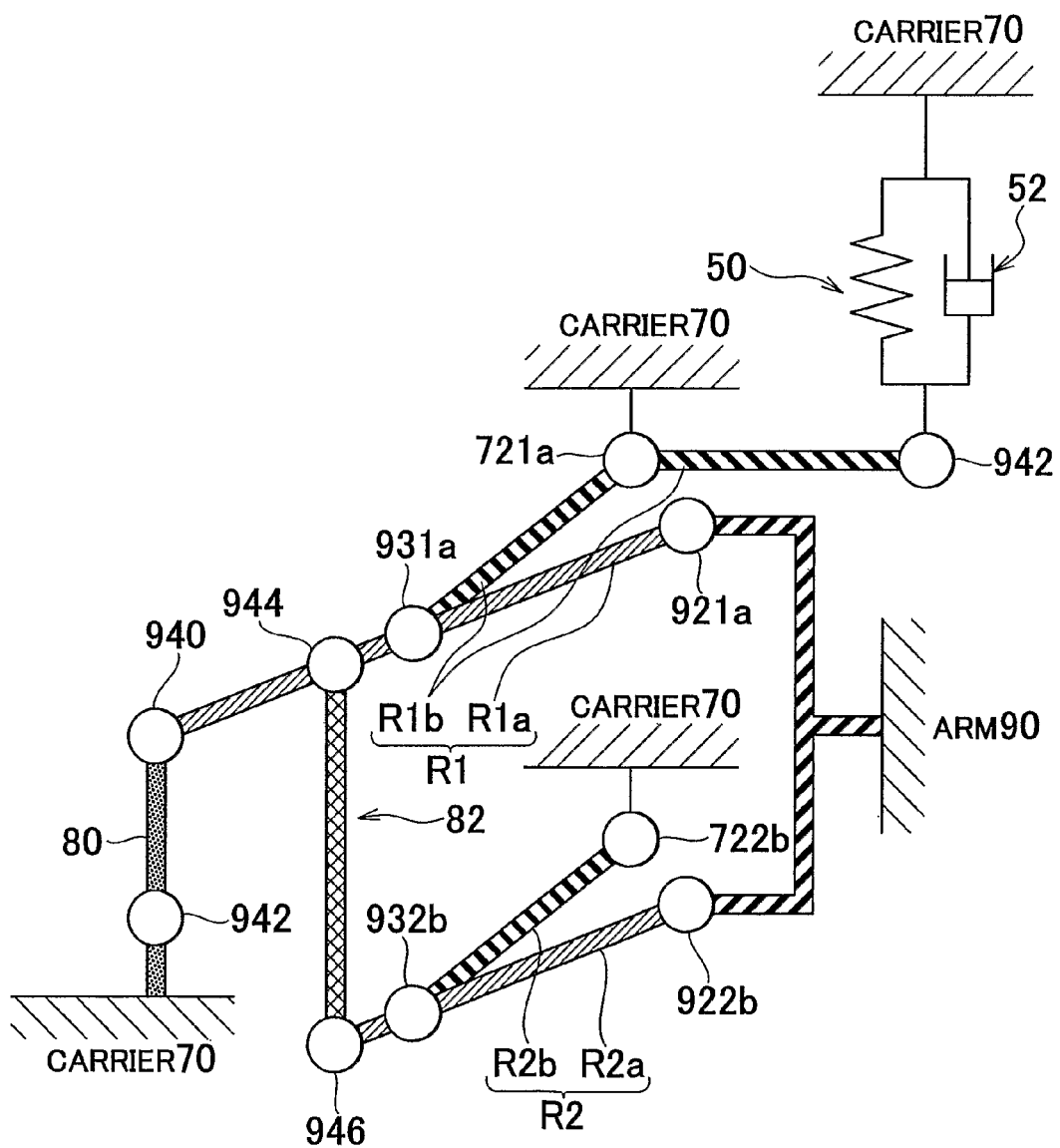
FIG. 13 illustrates the view schematically showing the structure of the main portions of the in-wheel suspension according to a modified version of the modified example, shown in FIG. 11, of the third embodiment.

FIG. 11 illustrates the perspective view of the tire/wheel assembly 10 viewed from the inside of the vehicle, showing the structure of the main portions of an in-wheel suspension according to this modified example of the third embodiment. In the description below, the in-wheel suspension according to the modified example of the third embodiment is applied to the rear wheel. However, the in-wheel suspension according to the modified example of the third embodiment may be applied to the front wheel. In the description below, the same or corresponding portions as/to those in the third embodiment will be denoted by the same reference numerals, and only the portions specific to the modified example will be described. In the modified example, multiple links are arranged in parallel in the vehicle-width direction. Accordingly, the description will be made using also the schematic view in FIG. 12.

Figure 8:
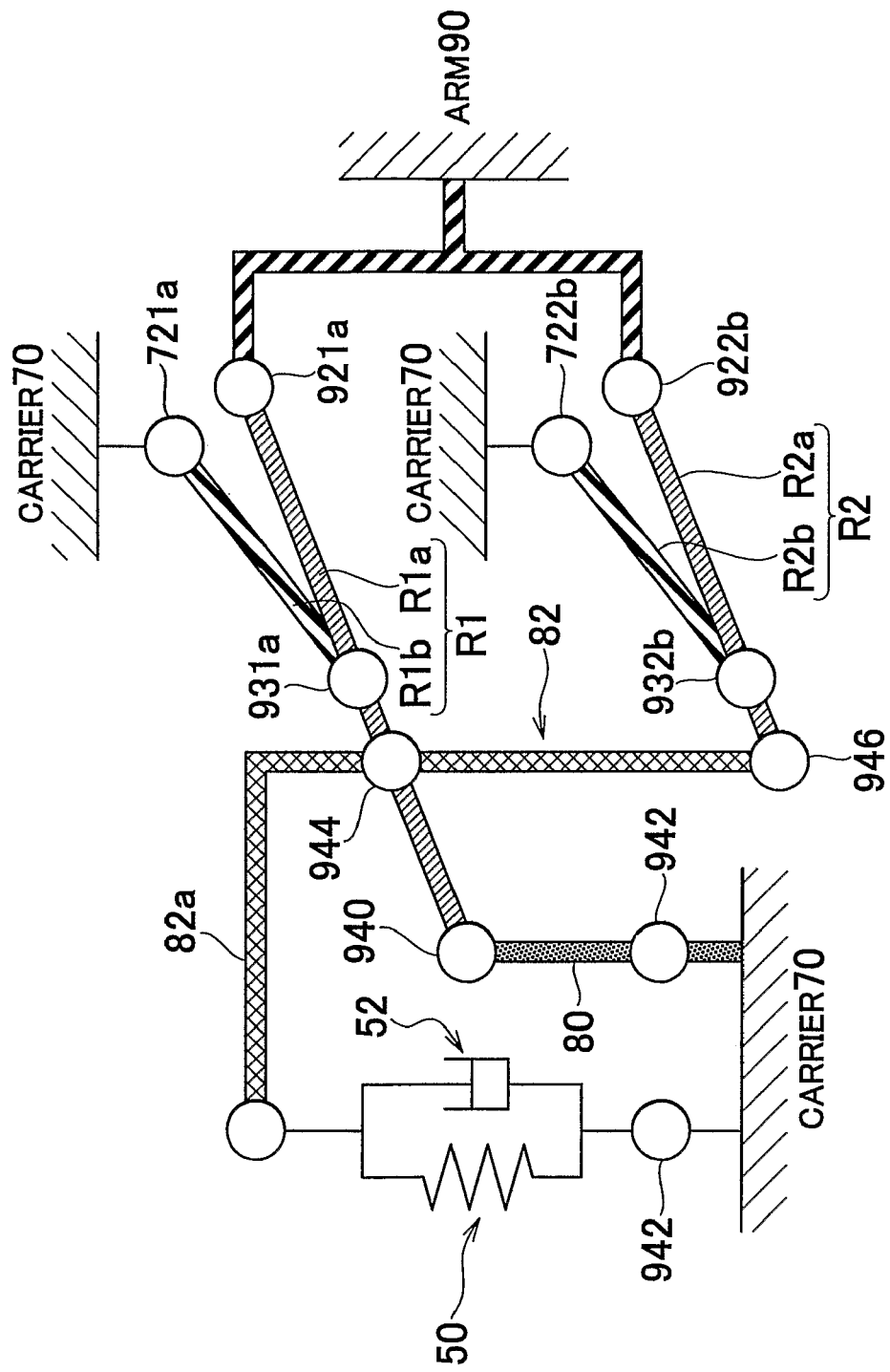
FIG. 8 illustrates the view schematically showing the structure of the main portions of the in-wheel suspension according to the third embodiment.

The modified example is different from the example shown in FIG. 8 in that the second restraining link 82 does not have the extension portion 82a extending from the pivot support shaft 944. In the modified example, the second restraining link 82 is coupled with the arm-side link R1a of the first link R1 via the pivot support shaft 944, and the second restraining link 82 is coupled with the arm-side link R2a of the second link R2 via the pivot support shaft 946.

Thus, the tire/wheel assembly 10 is supported such that the tire/wheel assembly 10 can move in the vertical/substantially vertical direction with respect to the arm 90 (with respect to the vehicle body) using the first link R1, the second link R2 and the restraining links 80, 82. Namely, the suspension according to the modified example is constrained with a certain degree of freedom in the vertical/substantially vertical movement. In the modified example, the second link R2 is coupled with the carrier 70 via the first restraining link 80, and the first link R1 and the second link R2 are coupled with each other via the second restraining link 82. Thus, the suspension is constrained with a certain degree of freedom in the vertical/substantially vertical movement. However, under the same concept as that shown in FIG. 9, the first link R1 may be coupled with the carrier 70 via the first restraining link 80, and the second link R2 may be coupled with the carrier 70 via the second restraining link 82, whereby the suspension is constrained with a certain degree of freedom in the vertical/substantially vertical movement.

In the modified example as well, the spring 50/absorber 52 is arranged in the wheel. The spring 50/absorber 52 is arranged between the carrier-side link R2b of the second link R2 and the carrier 70. More specifically, the carrier-side link R2b of the second link R2 has an extension portion that extends from the pivot support shaft 721a toward the rear of the vehicle. The lower end of the spring 50/absorber 52 (the lower end of the shell) is fitted to the end of the extension portion. The upper end of the spring 50/absorber 52 (the upper end of the rod) is fitted to the end of the arm portion 724 obliquely extending from the carrier 70 toward the rear of the vehicle.

Thus, when the tire/wheel assembly 10 moves in the vertical/substantially vertical direction (when the tire/wheel assembly 10 jounces/rebounds), the spring 50/absorber 52 extends and contracts. As a result, a shock applied to the vehicle body due to an input from the road surface is attenuated. In the modified example as well as in the embodiments described above, the structure of the first link R1 and the second link R2 may be different from that described above (refer to FIG. 13).

Figure 14A:
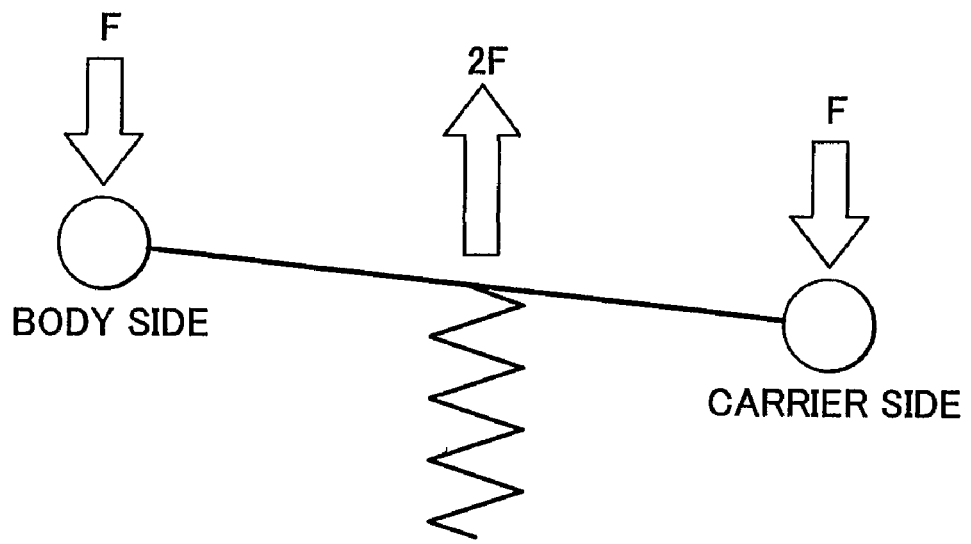
FIG. 14 illustrates the views showing the comparison of characteristics related to an input from a road surface between the in-wheel suspension according to the third embodiment and the in-wheel suspension according to the modified example of the third embodiment.
Figure 14B:
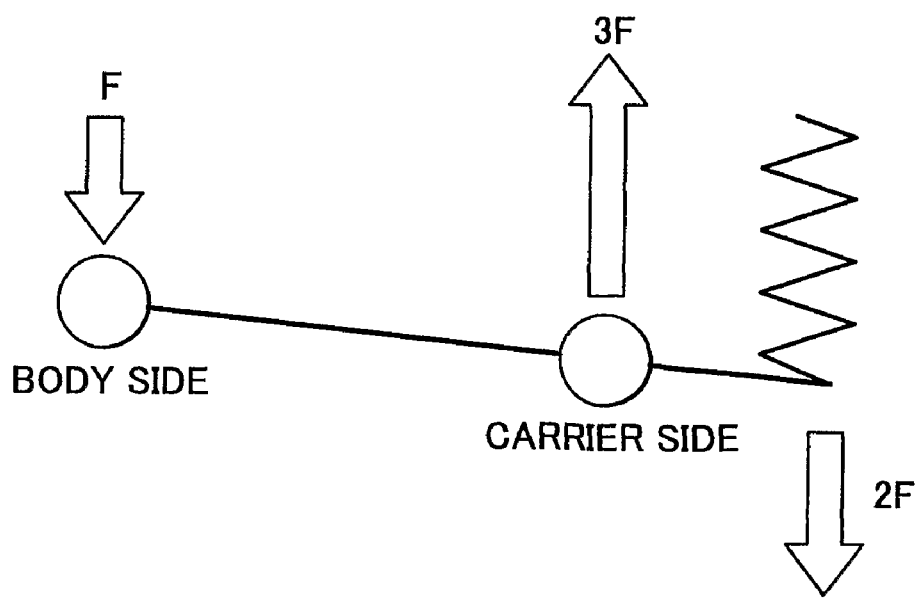

According to the modified example, as shown in FIG. 14B, the spring 50/absorber 52 is fitted to the link (R1, R2), which connects the vehicle body side to the carrier side, at the end of the link (R1, R2). Accordingly, if the spring arm ratio is 0.5, the force applied to the carrier side is greater than that when the spring 50/absorber 52 is fitted to the link (R1, R2) at the position between the body side and the carrier side (refer to FIG. 14A). However, except this, substantially the same effects can be obtained. In other words, the force received by the carrier side can be reduced, and the required strength of the link coupling portions on the carrier side and the carrier 70 can be reduced. As a result, the weight and size of the carrier 70 can be reduced and rigidity thereof can be enhanced.

Figure 15:
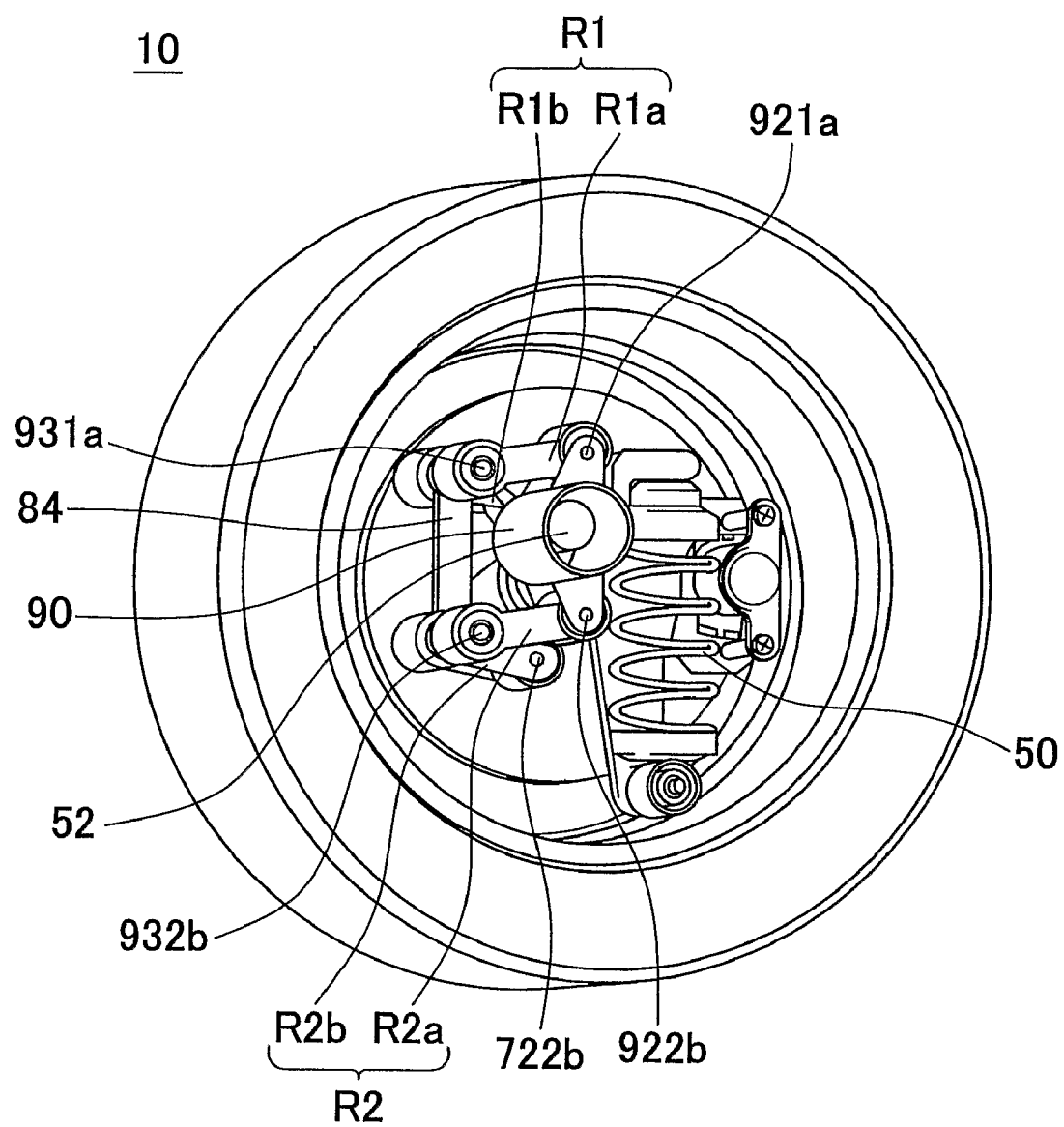
FIG. 15 illustrates the perspective view of the tire/wheel assembly 10, showing the structure of main portions of an in-wheel suspension according to a fourth embodiment of the invention.

FIG. 15 illustrates the perspective view of the tire/wheel assembly 10 viewed from the inside of the vehicle, showing the structure of the main portions of an in-wheel suspension according to a fourth embodiment of the invention. In FIG. 15, the left side is the front of the vehicle. In the following description, the in-wheel suspension according to the fourth embodiment is applied to a rear wheel. However, the in-wheel suspension according to the fourth embodiment may be applied to a front wheel. The same or corresponding portions as/to those in the first embodiment will be denoted by the same reference numerals, and only the portions specific to the fourth embodiment will be described below.

As shown in FIG. 15, the first link R1 includes the arm-side link R1$a$ that is pivotable about the link pivot support shaft 921$a$ of the arm 90; and the carrier-side link R1$b$ that is pivotable about the link pivot support shaft 721$a$ (not seen in FIG. 15) of the carrier 70. These two links R1$a$, R1$b$ are pivotably coupled with each other by the pivot support shaft 931$a$. The links R1$a$, R1$b$ are supported by the pivot support shaft 931$a$ such that the links R1$a$, R1$b$ can pivot about the axis substantially parallel to the wheel rotation axis, as will be described later in detail.

Similarly, the second link R2 includes the arm-side link R2$a$ that is pivotable about the link pivot support shaft 922$b$ of the arm 90; and the carrier-side link R2$b$ that is pivotable about the link pivot support shaft 722$b$ of the carrier 70. The two links R2$a$, R2$b$ are pivotably coupled with each other by the pivot support shaft 932$b$. The links R2$a$, R2$b$ are supported by the pivot support shaft 932$a$ such that the links R2$a$, R2$b$ can pivot about the axis substantially parallel to the wheel rotation axis, as will be described later in detail.

The pivot support shafts 921$a$, 721$a$, 931$a$ of the first link R1 and the pivot support shafts 922$b$, 722$b$, 932$b$ of the second link R2 are parallel to each other, and substantially parallel to the wheel rotational axis. In this state, the tire/wheel assembly 10 can move with respect to the arm 90 (with respect to the vehicle body) in the vertical/substantially vertical direction and in the substantially longitudinal direction. Namely, a certain degree of freedom in movements of the suspension in the vertical/substantially vertical direction and the substantially longitudinal direction of the suspension is ensured. However, the movement of the suspension in the rotational direction is restricted.

In the fourth embodiment as well, the spring 50/absorber 52 is arranged in the wheel. The spring 50 is arranged between the first link R1 and the carrier 70. Either a spring coil or an air spring may be employed as the spring 50. In the fourth embodiment shown in FIG. 15, the absorber 52 is a rotary electromagnetic absorber, and arranged in the hollow end portion 90$a$ of the arm 90. The structure of this absorber 52 will be described later in detail in a fifth embodiment. As shown in each of the embodiments described above, the absorber 52 may be a hydraulic absorber that is arranged coaxially or non-coaxially with the spring 50.

In the fourth embodiment, the pivot support shaft 931$a$ of the two links R1$a$, R1$b$ of the first link R1 and the pivot support shaft 932$b$ of the two links R2$a$, R2$b$ of the second link R2 are coupled with each other by a restraining link 84.

Figure 16:
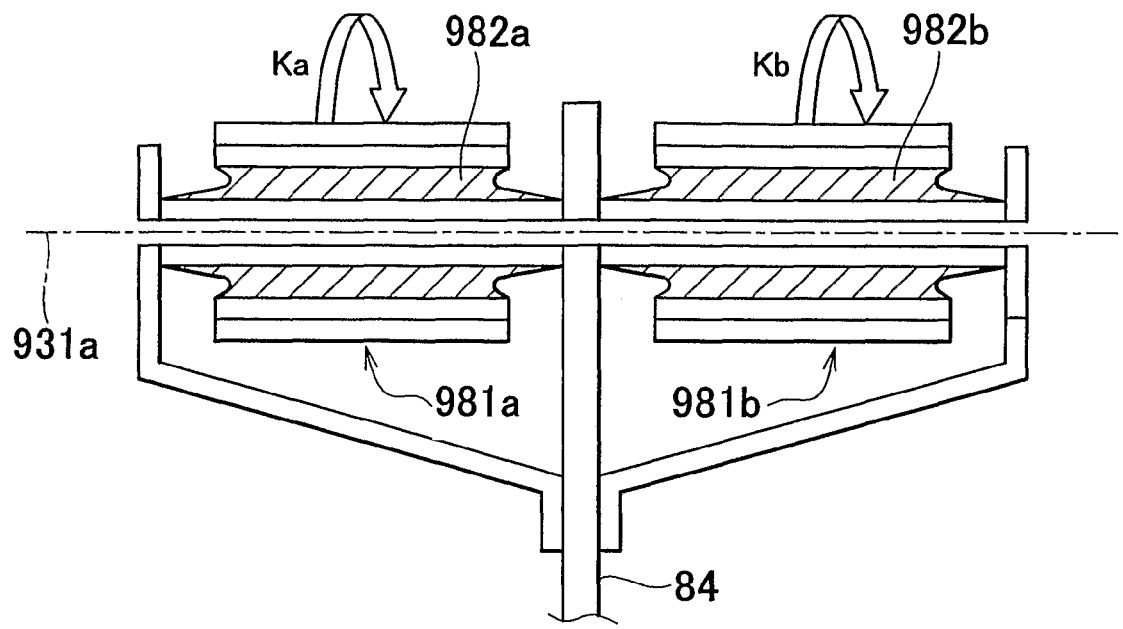
FIG. 16 illustrates the cross-sectional view of a restraining link 84 and a pivot support shaft 931a for links R1a, R1b.

FIG. 16 illustrates the cross-sectional view obtained by cutting the in-wheel suspension by the plane including the two pivot support shafts 931$a$, 932$b$. FIG. 16 shows the relationship between the restraining link 84 and the pivot support shaft 931$a$ of the links R1$a$, R1$b$. FIG. 16 shows only the cross section of the portion on the first link R1 side. However, the cross section of the portion on the second link R2 side, namely, the cross section of the restraining link 84 and the pivot support shaft 932$b$ of the links R2$a$, R2$b$ is the same as the cross section shown in FIG. 16.

As shown in FIG. 16, the two links R1$a$, R1$b$ are coupled with the pivot support shaft 931$a$ via bushings 981$a$, 981$b$, respectively. In the example shown in FIG. 16, the inner cylinders of the bushings 981$a$, 981$b$ are fixed to the restraining link 84, and the outer cylinders of the bushings 981$a$, 981$b$ are fixed to the links R1$a$, R1$b$, respectively. Rubber members 982$a$, 982$b$ are arranged between the inner cylinders and the respective outer cylinders of the bushings 981$a$, 981$b$. Alternatively, the outer cylinders of the bushings 981$a$, 981$b$ may be fixed to the restraining link 84, and the inner cylinders of the bushings 981$a$, 981$b$ may be fixed to the links R1$a$, R1$b$, respectively. Instead of the bushings 981$a$, 981$b$, other elastic members (for example, a combination of a ball-bushing and a torsion spring) having a torsional spring constant may be used.

Thus, relative pivot motion of the links R1$a$, R1$b$ around the pivot support shaft 931$a$ is restricted by the bushings 981$a$, 981$b$, respectively. Namely, when viewed from the side of the vehicle, the angle between the link R1$a$ and the restraining link 84 and the angle between the link R1$b$ and the restraining link 84 are restricted due to relationship with the torsional rigidities Ka, Kb of the bushings 981$a$, 98$b$. Similarly, in the second link R2, the angle between the link R2$a$ and the restraining link 84 and the angle between the link R2$b$ and the restraining link 84 are restricted due to the relationship with the torsional rigidities of the bushings. The torsional rigidities Ka, Kb of the bushings 981$a$, 981$b$ may be equal to each other. Alternatively, the torsional rigidities Ka, Kb of the bushings 981$a$, 981$b$ may be different from each other.

Figure 17:
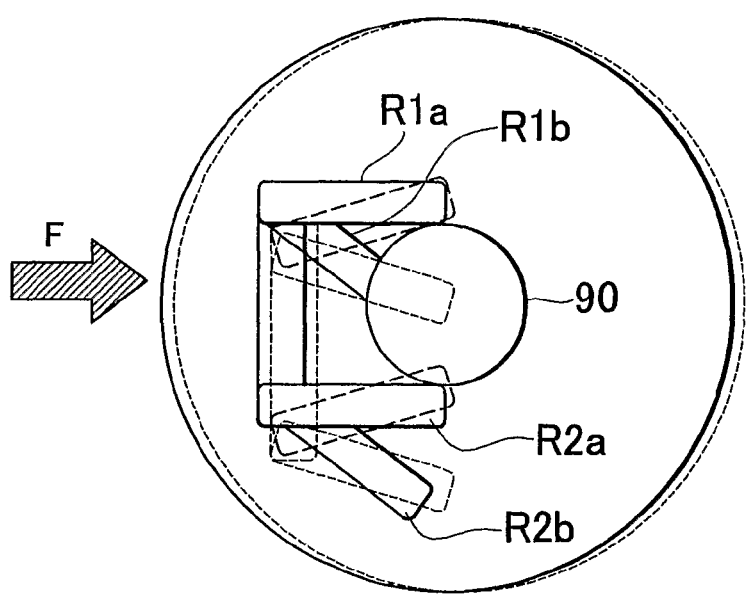
FIG. 17 illustrates the view for describing the compliance characteristics, for longitudinal force, of the in-wheel suspension according to the fourth embodiment.

FIG. 17 is the view for describing the performance (longitudinal compliance) of the suspension according to the fourth embodiment. FIG. 17 illustrates the schematic side view of the tire/wheel assembly 10. As shown in FIG. 17, if the load F is applied to the tire/wheel assembly 10 when the brake is applied, the positional relationship between the first link R1 and the second link R2 is changed from the relationship indicated by the solid lines to the relationship indicated by the dashed lines. Namely, the carrier-side links R1$b$, R2$b$ move toward the rear of the vehicle while a change in the angle which each of the links R1$a$, R1$b$, R2$a$, R2$b$ forms with the restraining link 84 is restricted by the torsion reaction force of the corresponding bushing. According to the fourth embodiment, therefore, the optimum longitudinal compliance can be achieved when the brake is applied, by setting the small torsional spring constants of the bushings 981a, 981b, while high rigidity of the coupling portion of each link is maintained. As a result, comfortable ride and stability in operation can be both achieved. According to the fourth embodiment, vibration in the longitudinal direction can be effectively attenuated by the elastic force of the bushings 981a, 981b applied in the torsional direction, as is clear from the description above. Therefore, the in-wheel suspension according to the fourth embodiment no longer requires the absorber for attenuating the force input in the substantially longitudinal direction. The in-wheel suspension according to the fourth embodiment requires only the absorber that attenuates the force input in the vertical/substantially vertical direction.

With the structure according to the fourth embodiment, the main portions of the suspension components can be arranged in the wheel using the inexpensive and reliable links R1, R2 (without using a sliding mechanism). Thus, it is possible to provide the in-wheel suspension having the structure obtained at low cost. Also, because the main portions of the suspension components are arranged in the wheel, the offset distance between the tire input point and each member in the vehicle-width direction is reduced. As a result, the required strength/rigidity of each member can be reduced, thereby reducing the weight of the in-wheel suspension.

Also, according to the fourth embodiment, the link coupling portions (the link pivot support shafts 721a, 722b, 921a, 922b) are arranged in the wheel. Therefore, the moment for changing the toe-angle, which is applied to the links R1, R2 and the link coupling portions and which is generated in response to the input in the tire in the longitudinal direction, is considerably small, and a change in the toe-angle in response to the longitudinal force is small. Accordingly, stability of the vehicle when the brake is applied can be enhanced.

Also, according to the fourth embodiment, the offset distance between the tire load point and the spring 50/absorber 52 in the vehicle-width direction is considerably small, and the moment for changing the camber angle due to the vehicle weight is small. Accordingly, the required strength of the links R1, R2 and the link coupling portions can be reduced, further reducing the weight of the in-wheel suspension.

According to the fourth embodiment, because the arm 90 is arranged on the front side of the spring 50/absorber 52, the arm 90 can protect the spring 50 from road debris such as a pebble. As described above with reference to FIG. 2, the cooling plate 40 that cools the absorber 52 by supplying air thereto and that protects the absorber 52 from road debris such as a pebble may be provided.

In the fourth embodiment, the bushings are arranged at the coupling portions at which the links R1, R2 are coupled with the restraining link 84. However, one of the links R1, R2 may be strongly coupled with the restraining link 84, and only the other link may be coupled with the restraining link 84 via the bushing.

In the fourth embodiment, the two links R1a, R1b of the link R1 are coupled with the restraining link 84 via the two bushings 981a, 981b, respectively (the same structure is provided to the link R2). However, one of the links R1a, R1b may be strongly coupled with the restraining link 84, and only the other link may be coupled with the restraining link 84 via the bushings 981a or 981b.

The fifth embodiment of the invention relates to the structure in which a rotatry electromagnetic absorber is used as the absorber 52. The structure according to the fifth embodiment may be applied to any one of the first to fourth embodiments described above. In the description below, the structure according to the fifth embodiment is applied to the fourth embodiment.

Figure 18:
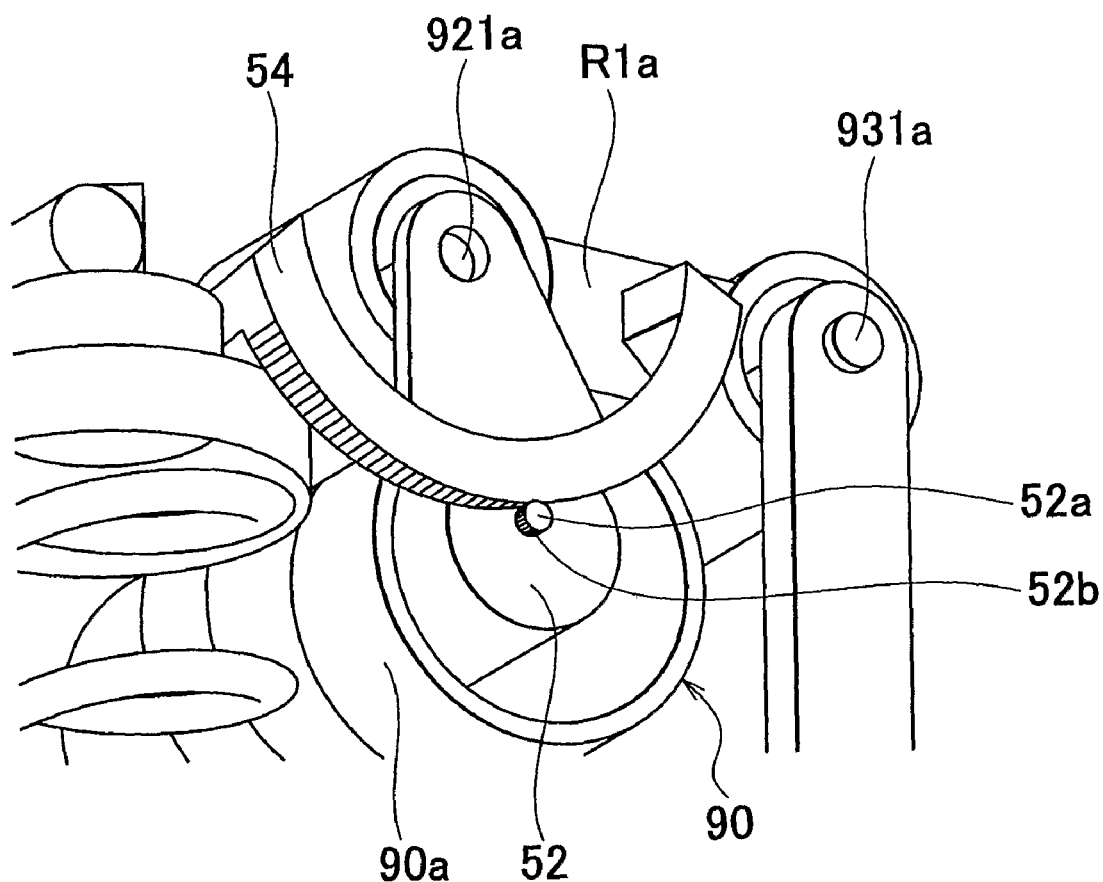
FIG. 18 illustrates the perspective view of a portion near the end portion of an arm 90 of the tire/wheel assembly 10 shown in FIG. 5 viewed from the outside of the vehicle, showing an absorber 52 according to a fifth embodiment of the invention.

FIG. 18 illustrates the perspective view of the portion near the end portion of the arm 90 of the tire/wheel assembly 10 shown in FIG. 15, when viewed from the outside of the vehicle. As shown in FIG. 18, the arm 90 is formed into a pipe-shape at least at the end portion 90a. The absorber 52, which is the rotary electromagnetic absorber, is arranged in the hollow portion of the end portion 90a. The absorber 52 is fixed to the arm 90 via a high-rigid fitting portion (not shown).

The absorber 52 has a rotating shaft 52a that protrudes from the hollow portion of the arm 90. The absorber 52 attenuates the rotational force input in the rotating shaft 52a. When the rotating shaft 52a is rotated, a magnetic field that acts to suppress rotation of the rotating shaft 52a is produced by a magnet housed in the absorber body. Thus, the rotational force input in the rotating shaft 52a is attenuated.

In the fifth embodiment, a gear 52b is formed in the rotating shaft 52a of the absorber 52. Alternatively, the gear 52b is provided onto the rotating shaft 52a of the absorber 52. The gear 52b meshes with a gear 54 formed integrally with the arm-side link R1a. The gear 54 uses the link pivot support shaft 921a of the arm-side link R1a as its pivot shaft. The absorber 52 is arranged such that the rotating shaft 52a thereof is parallel to the link pivot support shaft 921a. The absorber 52 and the gear 54 are provided with high rigidity against the forces applied in the directions other than the rotational direction around the link pivot support shaft 921a.

In the fifth embodiment, when the gear 54 pivots in accordance with pivot motions of the links R1, R2, the rotational force is transmitted to the rotating shaft 52a and attenuated by the absorber 52. Thus, when the tire/wheel assembly 10 moves in the vertical/substantially vertical direction (when the tire/wheel assembly 10 jounces/rebounds), the spring 50 extends and contracts in accordance with the pivot motion of the links R1, R2, and the rotating shaft 52a of the absorber 52 rotates in the normal/reverse directions. As a result, a shock applied to the vehicle body due to an input from the road surface is attenuated.

In the fifth embodiment, the gear 54 is formed integrally with the arm-side link R1a. However, the gear 54 may be formed integrally with any one of the other links R1b, R2a, R2b. In this case as well, when the gear 54 pivots about the link pivot support shaft of the link to which the gear 54 is provided, the rotating shaft 52a meshed with the gear 54 rotates, attenuating a shock applied to the vehicle body when the tire/wheel assembly 10 moves in the vertical/substantially vertical direction (when the tire/wheel assembly jounces/rebounds). According to the fifth embodiment described above, a rotary electromagnetic absorber, instead of a hydraulic absorber, is used as the absorber 52, and the absorber 52 is arranged in the arm 90, whereby flexibility in arrangement of the suspension components can be enhanced. Also, according to the fifth embodiment, the absorber 52 is effectively protected from road debris such as a pebble, because the absorber 52 is housed in the arm 90.

Figure 19:
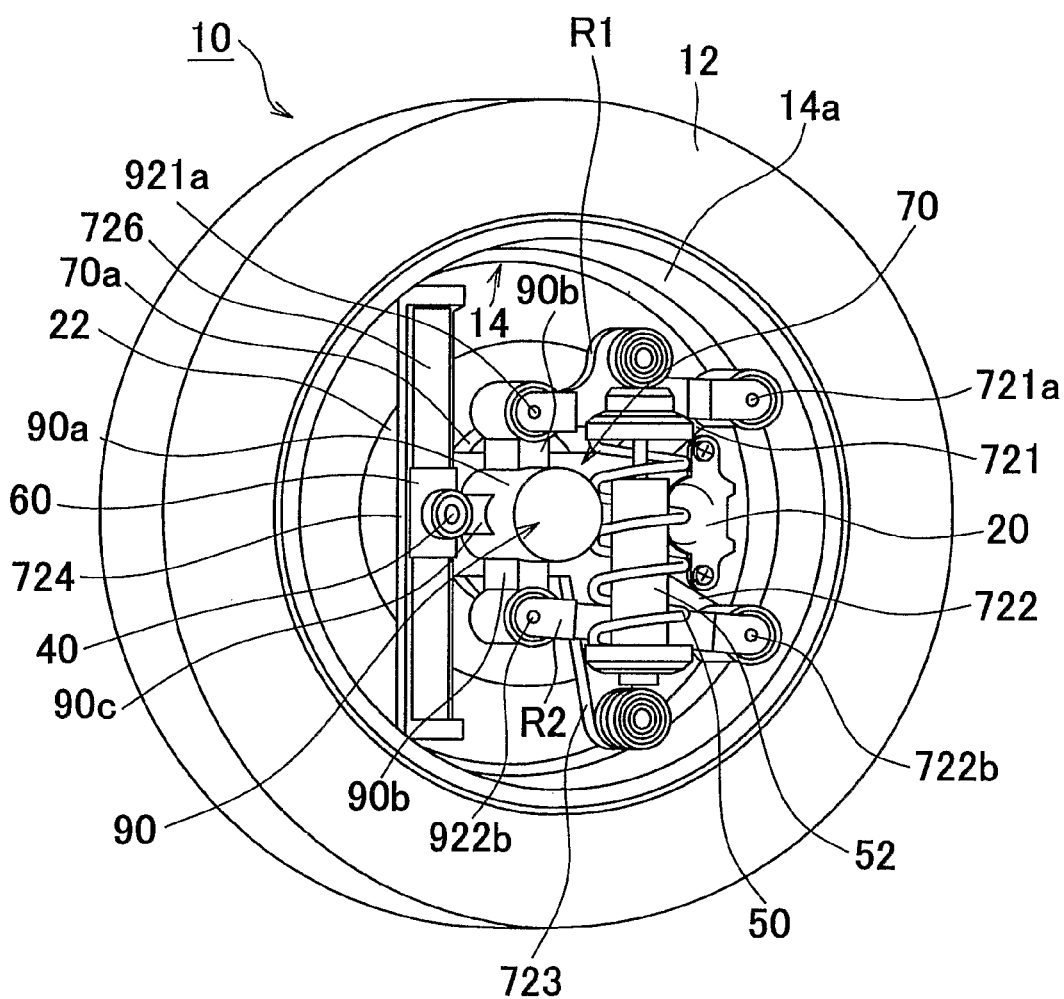
FIG. 19 illustrates the perspective view of the tire/wheel assembly 10, showing the structure of the main portions of an in-wheel suspension according to a sixth embodiment of the invention.

FIG. 19 is the perspective view of the tire/wheel assembly 10 viewed from the inside of the vehicle, showing the main portions of an in-wheel suspension according to a sixth embodiment of the invention. In FIG. 19, the left side is the front of the vehicle. In the description below, the in-wheel suspension according to the sixth embodiment is applied to a rear wheel. However, the in-wheel suspension according to the sixth embodiment may be applied to a front wheel. The same or corresponding portions as/to those in the first embodiment will be denoted by the same reference numerals, and only the portions specific to the sixth embodiment will be described below.

In the sixth embodiment, the carrier 70 has a sliding shaft support portion 724 that extends in the vertical/substantially vertical direction, as shown in FIG. 19.

The brake caliper 20 is provided between the two arm portions, namely, at the junction portion between the arm portion 721 and the arm portion 722.

Figure 20:
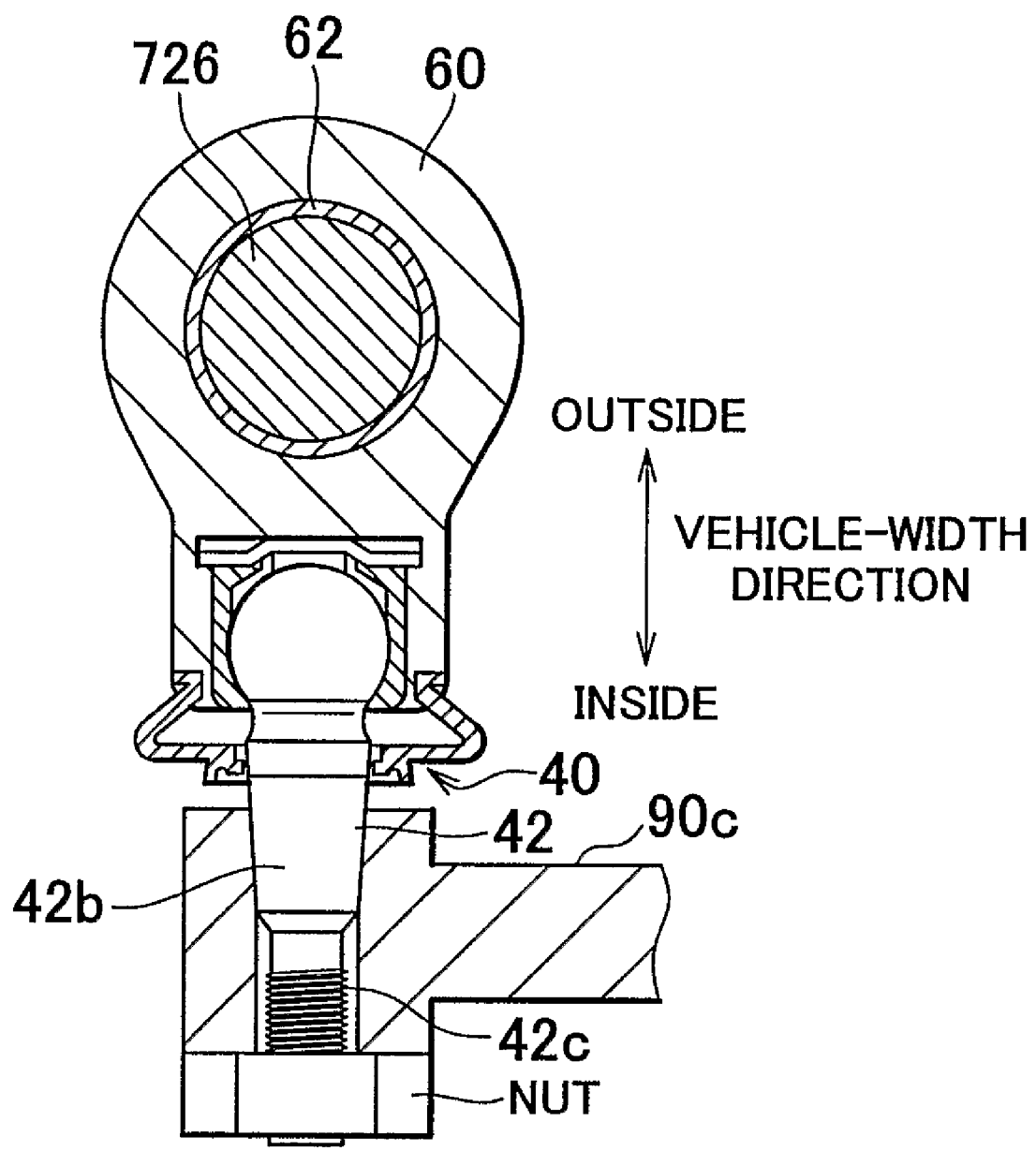
FIG. 20 illustrates the cross-sectional view showing the relationship between a sliding shaft member 726 and a sliding member 60, when the in-wheel suspension is cut in the direction perpendicular to the axis of the sliding shaft member 726.

A sliding shaft member 726, of which the axis extends in the vertical/substantially vertical direction, is fixed to the sliding shaft support member 724. The sliding shaft member 726 is provided with a sliding member 60 that can slide with respect to the sliding shaft member 726 in the axial direction and that can rotate around the sliding shaft member 726. More specifically, as shown in FIG. 20, the sliding shaft member 726 has the circular cross section that is constant in the axial direction at least in the region where the sliding member 60 slides. The sliding shaft member 726 passes through the sliding member 60 having an opening portion that corresponds to the sliding shaft member 726. A bushing 62 (for example, a metal bushing impregnated with oil) may be provided between the sliding member 60 and the sliding shaft member 726 to permit these members 60, 726 to smoothly move with respect to each other, thereby reducing sliding resistance generated therebetween.

Two arm portions 90*b* extend from the end portion 90*a* of the arm 90. One of the arm portions 90*b* extends upward and the other arm portion 90*b* extends downward. Cylindrical portions, of which the central axes extend in the vehicle-width direction, are formed at the ends of the two respective arm portions 90*b*, whereby the link pivot support portions 921*a*, 922*b* are arranged.

Figure 21:
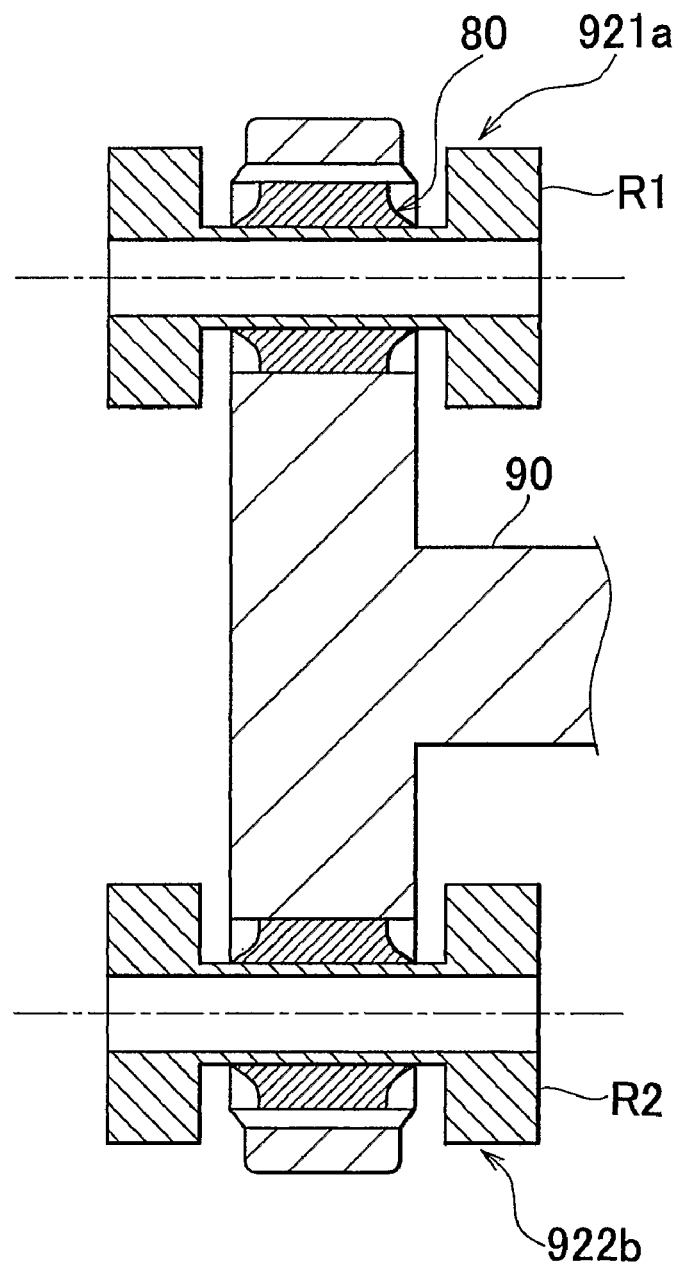
FIG. 21 illustrates the cross-sectional view of a portion (a rubber bushing 80) at which a link R and the arm 90 are coupled with each other.

The links R1, R2 and the arm 90 and/or the link R1, R2 and the carrier 70 are coupled with each other via cylindrical rubber bushings 80, of which the central axes extend in the vehicle-width direction, to achieve required longitudinal compliance of the vehicle. As shown in FIG. 21, each rubber bushing 80 includes the inner cylinder and the outer cylinder that are arranged coaxially with the bushing axis extending in the vehicle-width direction. A rubber member is provided between the inner cylinder and the outer cylinder. In the example shown in FIG. 21, the inner cylinders of the bushings are fixed to the links R1, R2, and the outer cylinders of the bushings are fixed to the link pivot support portions 921*a*, 922*b* on the arm 90 side and the link pivot support portions 721*a*, 722*b* on the carrier side.

Thus, the tire/wheel assembly 10 is supported so as to be movable in the vertical/substantially vertical direction with respect to the arm 90 (with respect to the vehicle body) using the first link R1 and the second link R2. Namely, the suspension according to the sixth embodiment is constrained with a certain degree of freedom in the movement in the vertical/substantially vertical direction while required compliance characteristics are maintained.

Because the offset distance between the tire load point and the spring 50/absorber 52 in the vehicle-width direction is considerably small and the moment for changing the camber angle due to the vehicle weight is small, the required strength of the links R1, R2 and the link coupling portions can be reduced.

According to the sixth embodiment, the spring 50/absorber 52 is fitted to the first link R1 or the second link R2, which connects the vehicle body side to the carrier side, at the position between the vehicle body side and the carrier side. Accordingly, the force applied to the carrier side can be reduced, and the required strength of the link coupling portions on the carrier side and the carrier 70 can be reduced. As a result, the weight and size of the carrier 70 can be reduced, and the rigidity of the carrier 70 can be enhanced.

The sliding member 60 is pivotably connected to the arm 90, which is the structure specific to the sixth embodiment. In the example shown in FIG. 19, the sliding member 60 is connected to the arm 90 via a ball-joint 40, as shown in FIG. 20. The ball-joint 40 includes a ball stud 42. A taper shaft portion 42*b* is formed in the ball stud 42. A screw shaft portion 42*c* is formed in the taper shaft portion 42*b* at the position near the end portion on the opposite side of the spherical portion of the ball stud 42. In the example shown in FIG. 20, the taper shaft portion 42*b* of the ball stud 42 included in the ball-joint 40 is fitted in a taper hole formed in an arm portion 90*c* extending from the arm portion 90 toward the front of the vehicle. Then, a nut is fastened to the screw shaft portion 42*c*, whereby the sliding member 60 is pivotably connected to the arm 90.

The ball joint 40 may be arranged at the side portion of the sliding shaft member 726 in the vehicle-width direction. Namely, the line connecting the rotation center of the sliding shaft member 726 to the center of the axis of the sliding shaft member 726 may be substantially parallel to the line extending in the vehicle-width direction, when viewed in the axial direction of the sliding shaft member 726 (when viewed as in FIG. 20). Thus, the in-wheel suspension can appropriately attenuate a longitudinal force. When a lateral force is applied to the tire/wheel assembly 10, the lateral force can be received by the sliding shaft member 726 and the sliding member 60 without actually generating a moment around the sliding shaft member 726. Thus, rigidity of the in-wheel suspension against the lateral force can be enhanced.

With the structure specific to the sixth embodiment described above, when the tire/wheel assembly 10 moves in the vertical/substantially vertical direction, the sliding member 60 rotates around the sliding shaft while sliding in the vertical/substantially vertical direction with respect to the sliding shaft member 726, causing the arm 90 to move in the vertical/substantially vertical direction. Accordingly, when the tire/wheel assembly 10 jounces/rebounds, the toe-angle of the tire/wheel assembly 10 can be changed.

In other words, when the tire/wheel assembly 10 moves in the vertical/substantially vertical direction, the carrier 70 pivots about the instantaneous centre between the paired links R1, R2, if relatively viewed from the arm side. At this time, displacement of the sliding shaft member 726 in the longitudinal direction of the vehicle is restricted by the ball joint 40. Therefore, the sliding shaft member 726 rotates with respect to the sliding shaft member 60 (namely, restriction in the movement of the sliding shaft member 726 in the longitudinal direction of the vehicle, which is imposed by the ball-joint 40, is offset by rotation of the sliding shaft member 726 with respect to the sliding member 60). As a result, the toe-angle of the tire/wheel assembly 10 changes.

According to the sixth embodiment, by appropriately making adjustment such that the carrier 70 moves along an appropriate path when the tire/wheel assembly 10 moves with respect to the arm 90 in the vertical/substantially vertical direction, the toe-angle of the tire/wheel assembly 10 can be changed by a desired amount when the tire/wheel assembly 10 moves in the vertical/substantially vertical direction (when the tire/wheel assembly 10 jounces/rebounds). For example, as shown in FIG. 19, the ball-joint 40 is arranged at the inner side portion of the sliding shaft member 726 in the vehicle-width direction. Thus, when the tire/wheel assembly 10 moves in the vertical/substantially vertical direction, the sliding shaft member 726 rotates so as to be drawn toward the inside of the vehicle, when relatively viewed from the arm side. As a result, the orientation of the tire/wheel assembly 10 can be changed such that the toe-in-angle increases when the tire/wheel assembly 10 jounces/rebounds.

From the same view point, by appropriately adjusting the inclination of the sliding shaft member 726, the toe-angle of the tire/wheel assembly 10 can be changed by a desired amount when the tire/wheel assembly 10 moves in the vertical/substantially vertical direction (when the tire/wheel assembly 10 jounces/rebounds). For example, by tilting the sliding shaft member 726 such that the upper end of the sliding shaft member 726 is on the front side of the lower end thereof when viewed from the side of the vehicle, the toe-in-angle can be changed by a greater amount when the tire/wheel assembly 10 jounces.

In the sixth embodiment, when a longitudinal force is applied to the tire/wheel assembly 10, the required compliance is maintained due to, for example, elastic deformation of the rubber bushings 80. Accordingly, when the longitudinal force is applied to the tire/wheel assembly 10, the sliding shaft member 726 moves toward the rear of the vehicle with respect to the arm 90. At this time, the movement of the sliding shaft member 726 in the longitudinal direction of the vehicle is restricted by the ball-joint 40. Accordingly, the sliding shaft member 726 rotates with respect to the sliding member 60, and the toe-angle of the tire/wheel assembly 10 changes.

According to the sixth embodiment described above, the toe-angle of the tire/wheel assembly 10 can be changed by a desired amount when a longitudinal force is applied, while required compliance for the longitudinal. For example, as shown in FIG. 19, because the ball-joint 40 is arranged at the inner side portion of the sliding shaft member 726 in the vehicle-width direction, the sliding shaft member 726 rotates so as to be drawn toward the inside of the vehicle when the longitudinal force is applied, if relatively viewed from the arm side. Thus, the orientation of the tire/wheel assembly 10 can be changed such that the toe-in-angle increases, when the tire/wheel assembly 10 jounces/rebounds.

In the sixth embodiment, the span length between the coupling points at which the first link R1 and the second link R2 are coupled with the arm 90 is set to be shorter than the span length between the coupling points at which the first link R1 and the second link R2 are coupled with the carrier 70. Namely, in the normal condition where occupants whose weight is within the predetermined range are onboard, the steering angle is the neutral value, and the vehicle is standstill, the instantaneous centre between the paired links R1, R2 may be set on the side close to the front of the vehicle (on the side where the sliding shaft member 726 is provided). Thus, the amount of vertical/substantially vertical movement of the sliding member 60 in accordance with the vertical/substantially vertical movement of the tire/wheel assembly 10 can be reduced. As a result, the weight and size of the sliding mechanism including the sliding shaft member 726 and the sliding member 60 can be reduced.

In the sixth embodiment, the spring 50/absorber 52 can be arranged in the wheel by arranging the center portions of the first link R1 and the second link R2 outboard of the link pivot support shafts 721a, 722b, 921a, 922b. When the offset distance is not sufficient, the spring 50/absorber 52 may partially protrude from the wheel in the vehicle-width direction. Alternatively, the spring 50/absorber 52 may be arranged between the first link R1/the second link R2 and the carrier 70 in the vehicle-width direction by arranging the center portion of at least one of the first link R1 and the second link R2 inboard of the link pivot support shafts 721a, 722b, 921a, 922b.

In the sixth embodiment shown in FIG. 19, the spring 50 is arranged between the lower spring seat and the upper spring seat so as to surround the absorber 52, and the spring 50 and the absorber 52 extend and contract coaxially with each other in the vertical/substantially vertical direction. However, the spring 50 and the absorber 52 need not be arranged coaxially with each other. Also, either a spring coil or an air spring may be used as the spring 50. The absorber 52 may be either a hydraulic absorber that attenuates a shock input in the vertical/substantially vertical direction or a rotary electromagnetic absorber that attenuates a shock input in the rotational direction.

Figure 22:
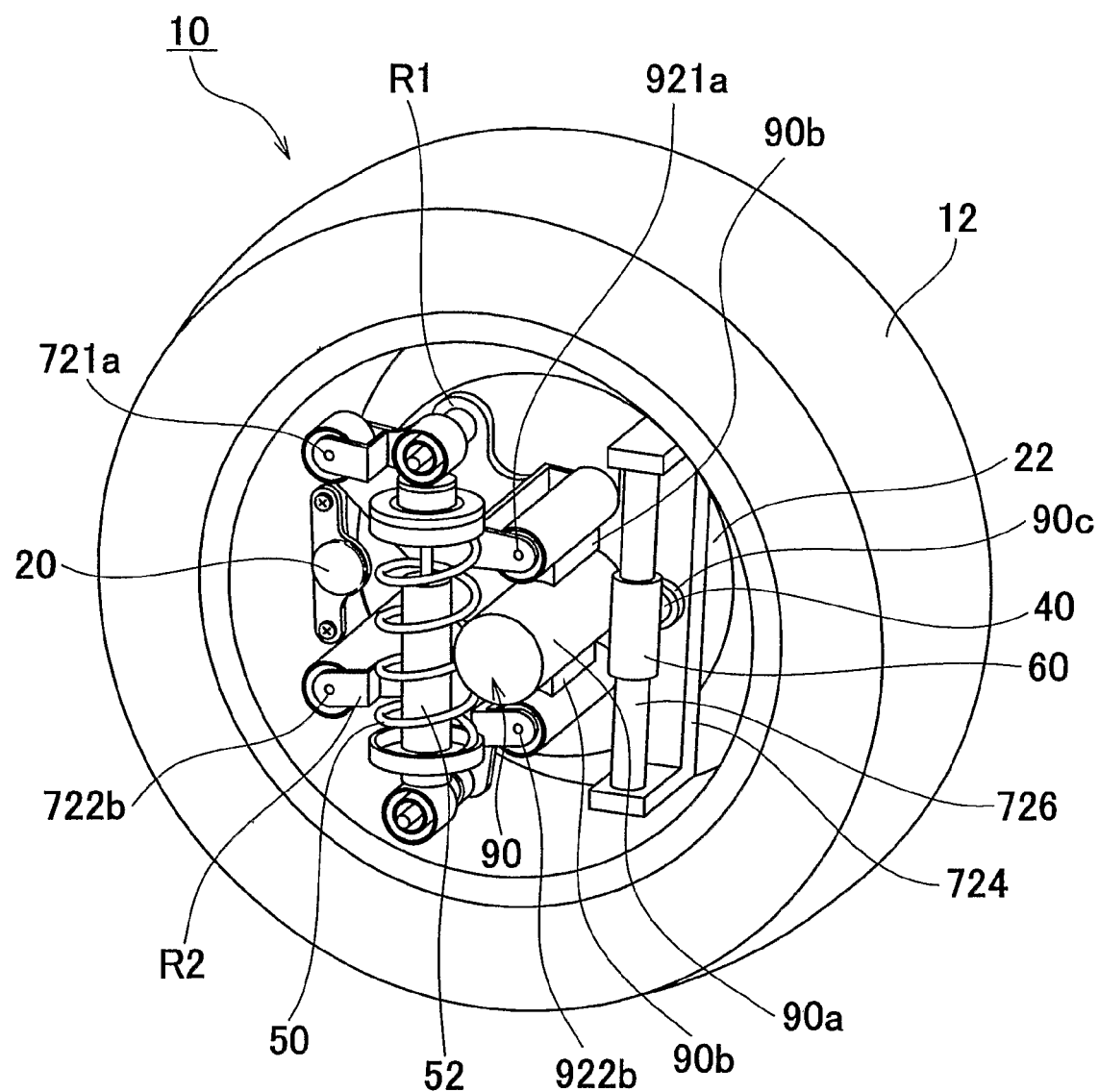
FIG. 22 illustrates the perspective view of the tire/wheel assembly 10, showing the structure of the main portions of an in-wheel suspension according to a seventh embodiment of the invention.

FIG. 22 illustrates the perspective view of the tire/wheel assembly viewed from the inside of the vehicle, showing the main portions of an in-wheel suspension according to a seventh embodiment of the invention. In FIG. 22, the left side is the front of the vehicle. In the description below, the in-wheel suspension according to the seventh embodiment is applied to a rear wheel. However, the in-wheel suspension according to the seventh embodiment may be applied to a front wheel. The same or corresponding portions as/to those in the sixth embodiment will be denoted by the same reference numerals, and only portions specific to the seventh embodiment will be described below.

The in-wheel suspension according to the seventh embodiment differs from the in-wheel suspension according to the sixth embodiment in that the sliding mechanism including the sliding shaft member 726 and the sliding member 60 is arranged on the rear side of the wheel center. Namely, the in-wheel suspension according to the seventh embodiment and the in-wheel suspension according to the sixth embodiment are symmetric with respect to each other, about the wheel center, in the longitudinal direction.

More specifically, in the seventh embodiment, the sliding member 60 is pivotably connected to the arm 90. As shown in FIGS. 20 and 22, the taper shaft portion 42b of the ball-joint 40 is fitted in the taper hole formed in the arm portion 90c extending from the arm 90 toward the rear of the vehicle, and the nut is then fastened to the screw shaft portion 42c, whereby the sliding member 60 is pivotably connected to the arm 90.

In the seventh embodiment as well, the toe-angle of the tire-wheel assembly 10 can be changed by a desired amount when the tire/wheel assembly 10 moves in the vertical/substantially vertical direction (when the tire/wheel assembly 10 jounces/rebounds) by making an adjustment such that the carrier 70 moves along an appropriate path when the tire/wheel assembly 10 moves in the vertical/substantially vertical direction with respect to the arm 90. For example, as shown in FIG. 22, because the ball-joint 40 is arranged at the outer side portion of the sliding shaft member 726 in the vehicle-width direction, the sliding shaft member 726 rotates so as to be drawn toward the outside of the vehicle when the tire/wheel assembly 10 moves in the vertical/substantially vertical direction, if relatively viewed from the arm side. As a result, the orientation of the tire/wheel assembly 10 can be changed such that the toe-in-angle increases, when the tire/wheel assembly 10 jounces/rebounds.

From the same view point, the toe-angle of the tire-wheel assembly 10 can be changed by a desired amount when the tire/wheel assembly 10 moves in the vertical/substantially vertical direction (when the tire/wheel assembly 10 jounces/rebounds) by appropriately adjusting the inclination of the sliding shaft member 726. For example, the tire/wheel assembly 10 can be changed such that the toe-in-angle further increases when the tire/wheel assembly 10 jounces, by tilting the sliding shaft member 726 such that the upper end of the sliding shaft member 726 is on the rear side of the lower end thereof.

In the seventh embodiment, when a longitudinal force is applied to the tire/wheel assembly 10, the sliding shaft member 726 moves toward the rear of the vehicle with respect to the arm 90. At this time, displacement of the sliding shaft member 726 in the longitudinal direction of the vehicle is restricted by the ball-joint 40. Therefore, the sliding shaft member 726 rotates with respect to the sliding member 60 (namely, restriction in the movement of the sliding shaft member 726 in the longitudinal direction of the vehicle, which is imposed by the ball-joint 40, is offset by rotation of the sliding shaft member 726 with respect to the sliding member 60), and the toe-angle of the tire/wheel assembly 10 changes. According to the seventh embodiment, the toe-angle of the tire/wheel assembly 10 can be changed by a desired amount when a longitudinal force is applied, while required compliance for the longitudinal force is maintained. For example, by arranging the ball-joint 40 at the outer side of the sliding shaft member 726 in the vehicle-width direction as shown in FIG. 22, the sliding shaft member 726 rotates so as to be drawn toward the outside of the vehicle when the longitudinal force is applied, if relatively viewed from the arm side. Thus, the orientation of the tire/wheel assembly 10 can be changed such that the toe-in-angle increases when the tire/wheel assembly 10 jounces/rebounds.

In the seventh embodiment, the span length between the coupling points at which the first link R1 and the second link R2 are coupled with the arm 90 is set to be shorter than the span length between the coupling points at which the first link R1 and the second link R2 are coupled with the carrier 70. Namely, in the normal condition, the instantaneous centre between the paired links R1, R2 may be set on the side close to the rear of the vehicle (on the side where the sliding shaft member 726 is provided). Thus, the amount of vertical/substantially vertical movement of the sliding member 60 in accordance with the vertical/substantially vertical movement of the tire/wheel assembly 10 can be reduced. As a result, the weight and size of the sliding mechanism including the sliding shaft member 726 and the sliding member 60 can be reduced.

Figure 23:
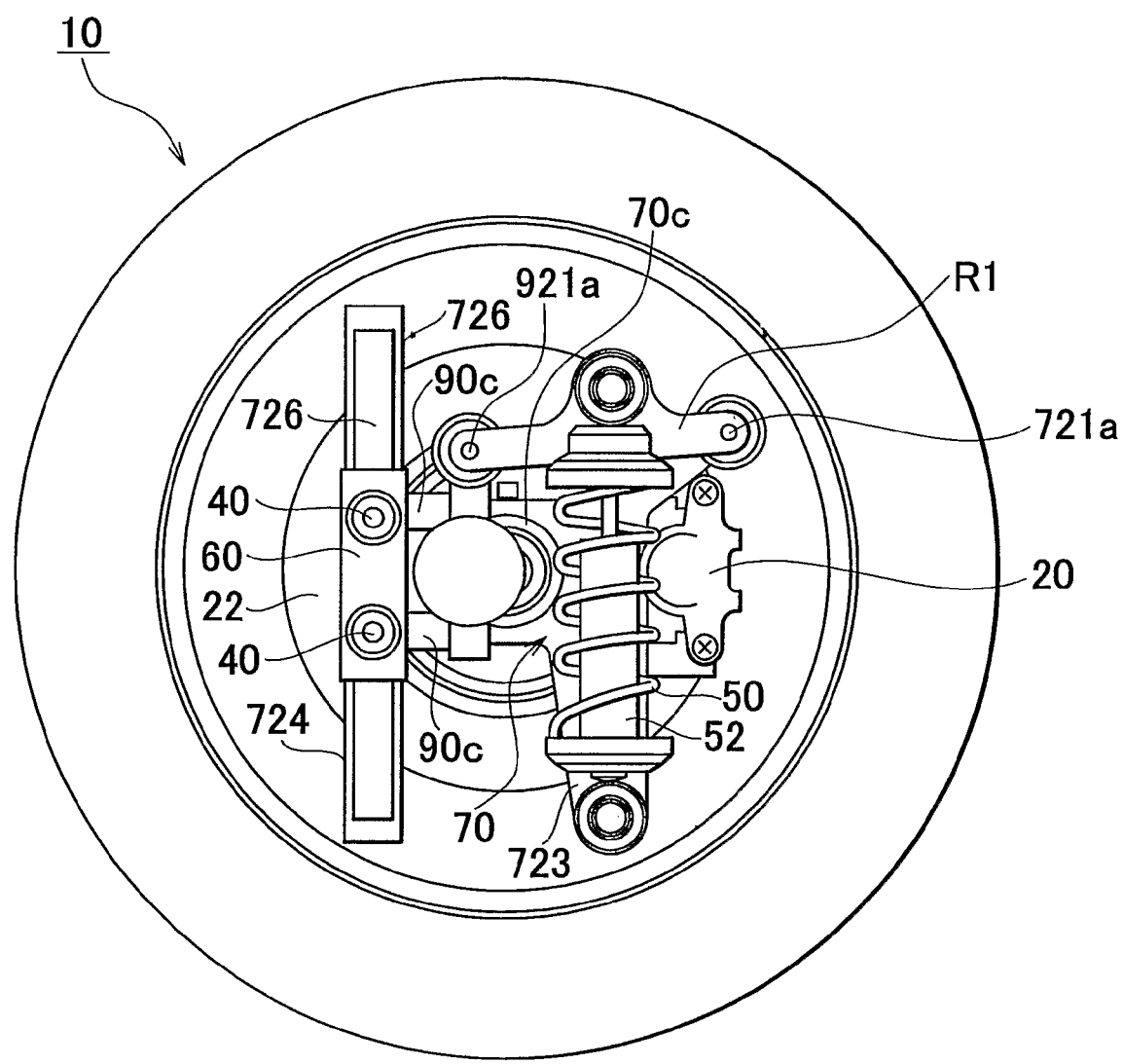
FIG. 23 illustrates the view of the tire/wheel assembly 10 viewed from the inside of the vehicle, showing the structure of the main portions of an in-wheel suspension according to an eighth embodiment of the invention.

FIG. 23 illustrates the perspective view of the tire/wheel assembly when viewed from the inside of the vehicle, showing the structure of main portions of an in-wheel suspension according to an eighth embodiment of the invention. In FIG. 23, the left side is the front of the vehicle. In the description below, the in-wheel suspension according to the eighth embodiment is applied to a rear-wheel. However, the in-wheel suspension according to the eighth embodiment may be applied to a front wheel. The same or corresponding portions as/to those in the sixth embodiment will be denoted by the same reference numerals, and only the portions specific to the eighth embodiment will be described in detail.

In the eighth embodiment, the sliding member 60 and the arm 90 are connected to each other at two points that are apart from each other in the vertical/substantially vertical direction. In the example shown in FIG. 23, the sliding member 60 is connected to the arm 90 via two ball-joints 40 (see FIG. 20 for an example of a manner in which the sliding member 60 is connected to the arm 90). More specifically, the taper shaft portions of the two ball-joints 40 are fitted in the respective taper holes formed in the two arm portions 90c extending from the arm 90 toward the front of the vehicle, and the two nuts are fastened to the respective two screw shaft portions 42c, whereby the sliding member 60 is pivotably connected to the arm 90 at the two points.

According to the eighth embodiment, by connecting the sliding member 60 to the arm 90 at the two points, rigidity of the in-wheel suspension against a force for changing the camber angle can be enhanced. Also, according to the eighth embodiment, the offset distance between the tire load point and the spring 50/absorber 52 in the vehicle-width direction is considerably small, and the moment for changing the camber angle due to the vehicle weight is small. Accordingly, in combination with the improvement in rigidity of the in-wheel suspension against the force for changing the camber angle, which is offered by connecting the sliding member 60 to the arm 90 at two points, the required strength of the second link R2 and the link coupling portions of the second link R2 can be reduced.

In the eighth embodiment, the sliding member 60 and the arm 90 are connected to each other at two points. Accordingly, the freedom in the movement of the suspension in the rotational direction and the direction in which the camber angle changes is restricted. Therefore, the number of the links R need not be two. Therefore, the second link R2 is not provided in the in-wheel suspension shown in FIG. 23.

In the eighth embodiment, the sliding member 60 and the arm 90 are connected to each other at two points one of which is above the wheel center and the other of which is below the wheel center. In addition, the line extending in the axial direction of the sliding shaft member 726 and the line connecting the two connection portions at which the sliding member 60 is connected to the arm 90 (the line connecting the rotation centers of the two ball joints 40) may be non-parallel and non-coplanar. In this case, when the tire/wheel assembly 10 moves in the vertical/substantially vertical direction (when the tire/wheel assembly 10 jounces/rebounds), the movement of the sliding shaft member 726 with respect to the upper ball-joint 40 is different from the movement of the sliding shaft member 726 with respect to the lower ball-joint 40, if relatively viewed from the arm side. Accordingly, the axial direction of the sliding shaft member 726 changes with respect to the arm 90 (vehicle body). Thus, the camber angle of the tire/wheel assembly 10 changes.

Figure 24:
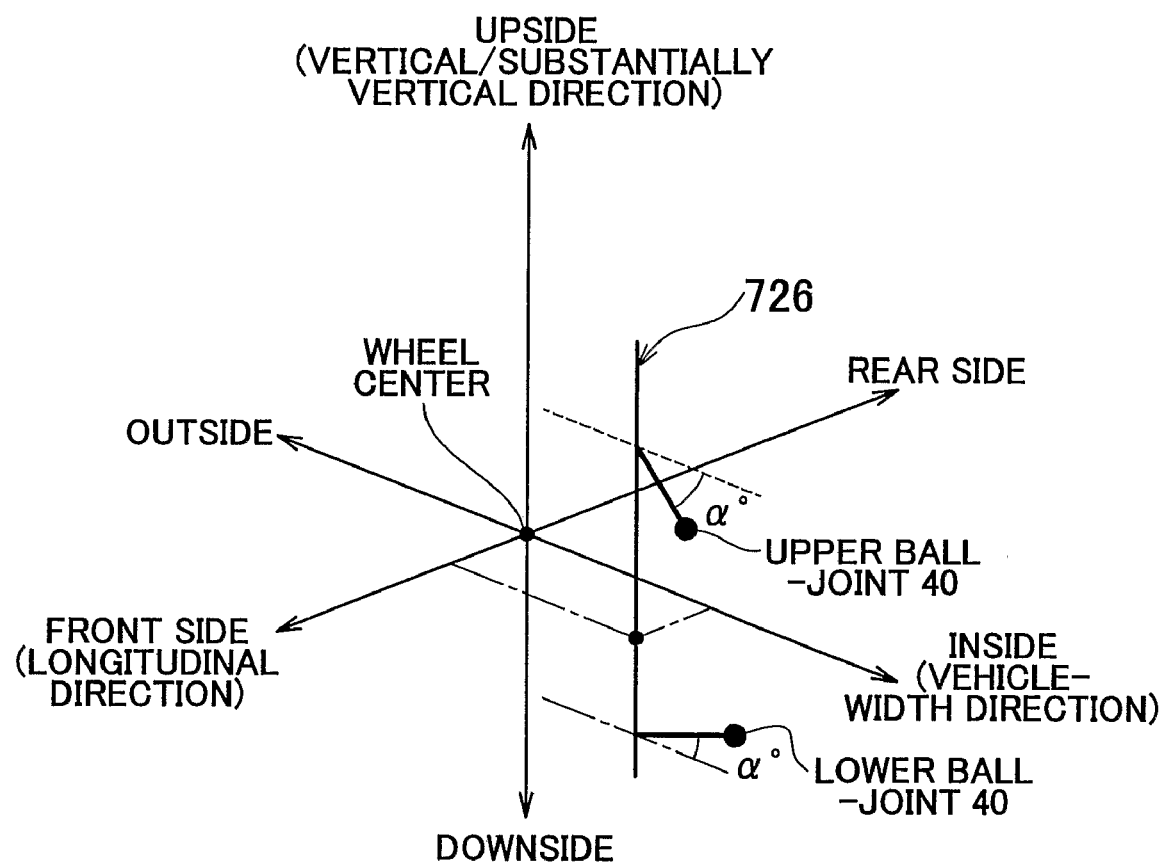
FIG. 24 illustrates the view showing an example of the non-parallel and non-coplanar positional relationship between the sliding shaft member 726 and the line connecting the rotation center of the upper ball-joint 40 to the rotation center of the lower ball-joint 40.

According to the eighth embodiment, the camber angle of the tire/wheel assembly 10 can be changed by a desired amount when the tire/wheel assembly 20 jounces/rebounds, by appropriately setting the non-parallel and non-coplanar relationship between the line extending in the axial direction of the sliding shaft member 726 and the line connecting the two connection portions at which the sliding member 60 is connected to the arm 90. For example, as shown in FIG. 24, the upper ball-joint 40 is arranged at the inner side portion of the sliding shaft member 726 in the vehicle-width direction such that the line connecting the upper ball-joint 40 to the sliding shaft member 726 deviates, in the clockwise direction, from the line extending in the vehicle-width direction by an angle $\alpha$. In addition, the lower ball-joint 40 is arranged at the inner side portion of the sliding shaft member 726 in the vehicle-width direction such that the line connecting the lower ball-joint 40 to the sliding shaft member 726 deviates, in the counterclockwise direction, from the line extending in the vehicle-width direction by the angle $\alpha$. With this structure, when the tire/wheel assembly 10 jounces, the sliding shaft member 726 is tilted such that the upper end of the sliding shaft member 726 is positioned outboard of the lower end of the sliding shaft member 726. As a result, the orientation of the tire/wheel assembly 10 can be changed such that the negative camber angle increases when the tire/wheel assembly 10 jounces.

Figure 25:
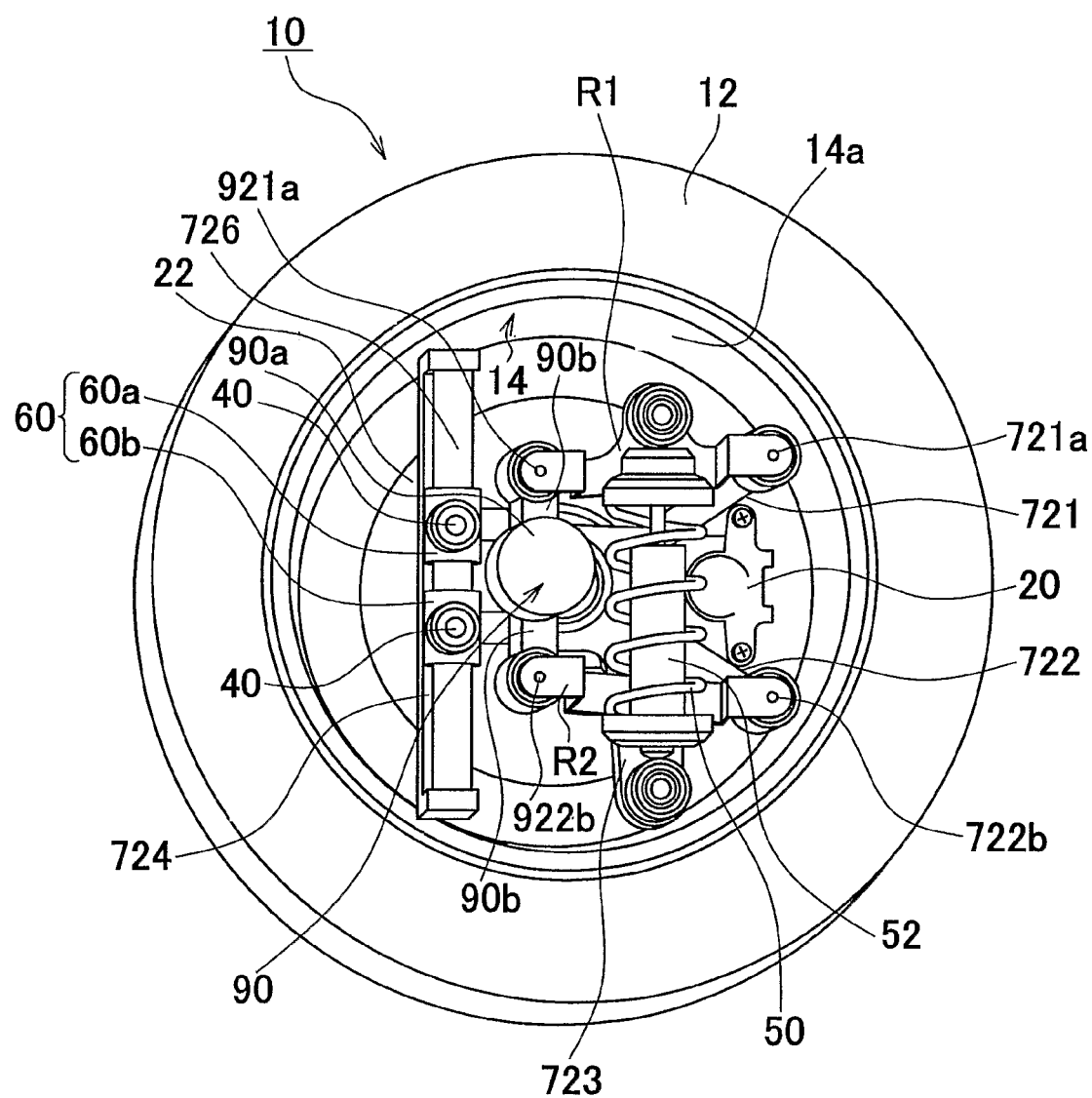
FIG. 25 illustrates the perspective view of the tire/wheel assembly 10, showing the structure of the main portions of an in-wheel suspension according to a ninth embodiment of the invention.

FIG. 25 illustrates the perspective view of the tire/wheel assembly when viewed from the inside of the vehicle, showing the structure of the main portions of an in-wheel suspension according to a ninth embodiment of the invention. In FIG. 25, the left side is the front of the vehicle. In the description below, the in-wheel suspension according to the ninth embodiment is applied to a rear wheel. However, the in-wheel suspension according to the ninth embodiment may be applied to a front wheel. The same or corresponding portions as/to those in the sixth embodiment are denoted by the same reference numerals, and only the portions specific to the ninth embodiment will be described in detail.

In the ninth embodiment as well as in the eighth embodiment, the sliding member 60 and the arm 90 are connected to each other at two points that are apart from each other in the vertical/substantially vertical direction. In the ninth embodiment, the sliding member 60 has an upper portion 60a and a lower portion 60b that are apart from each other in the substantially vertical direction. The upper portion 60a and the lower portion 60b are pivotably connected to the arm 90 independently of each other. In the example shown in FIG. 25, the upper portion 60a of the sliding member 60 is connected to the arm 90 via the upper ball-joint 40. The lower portion 60b of the sliding member 60 is connected to the arm 90 via the lower ball-joint 40 (see FIG. 20 for an example of a manner in which the sliding member 60 is connected to the arm 90).

In the ninth embodiment, the sliding member 60 has the upper portion 60a and the lower portion 60b. Accordingly, when a lateral force is applied, the lateral force is received by the two connection portions. Accordingly, inappropriate positional relationship between the sliding member 60 and the sliding shaft member 726 can be prevented. Namely, according to the ninth embodiment, because the sliding member 60 and the arm 90 are connected to each other at two points, the inappropriate positional relationship between the sliding member 60 and the sliding shaft member 726, which may occur when the lateral force is applied, can be prevented while rigidity against the force for changing the camber angle is enhanced.

The embodiments of the invention that have been described in the specification are to be considered in all respects as illustrative and not restrictive. All changes which come within the meaning and range of equivalency of the claims are therefore intended to be embraced therein.

For example, in the embodiments described above, the spring 50/absorber 52 is arranged on the rear side of the arm 90 such that the arm 90 protects the spring 50/absorber 52 from road debris such as a pebble. However, the invention is not limited to this structure. The spring 50/absorber 52 may be arranged on the front side of the arm 90.

Figure 26:
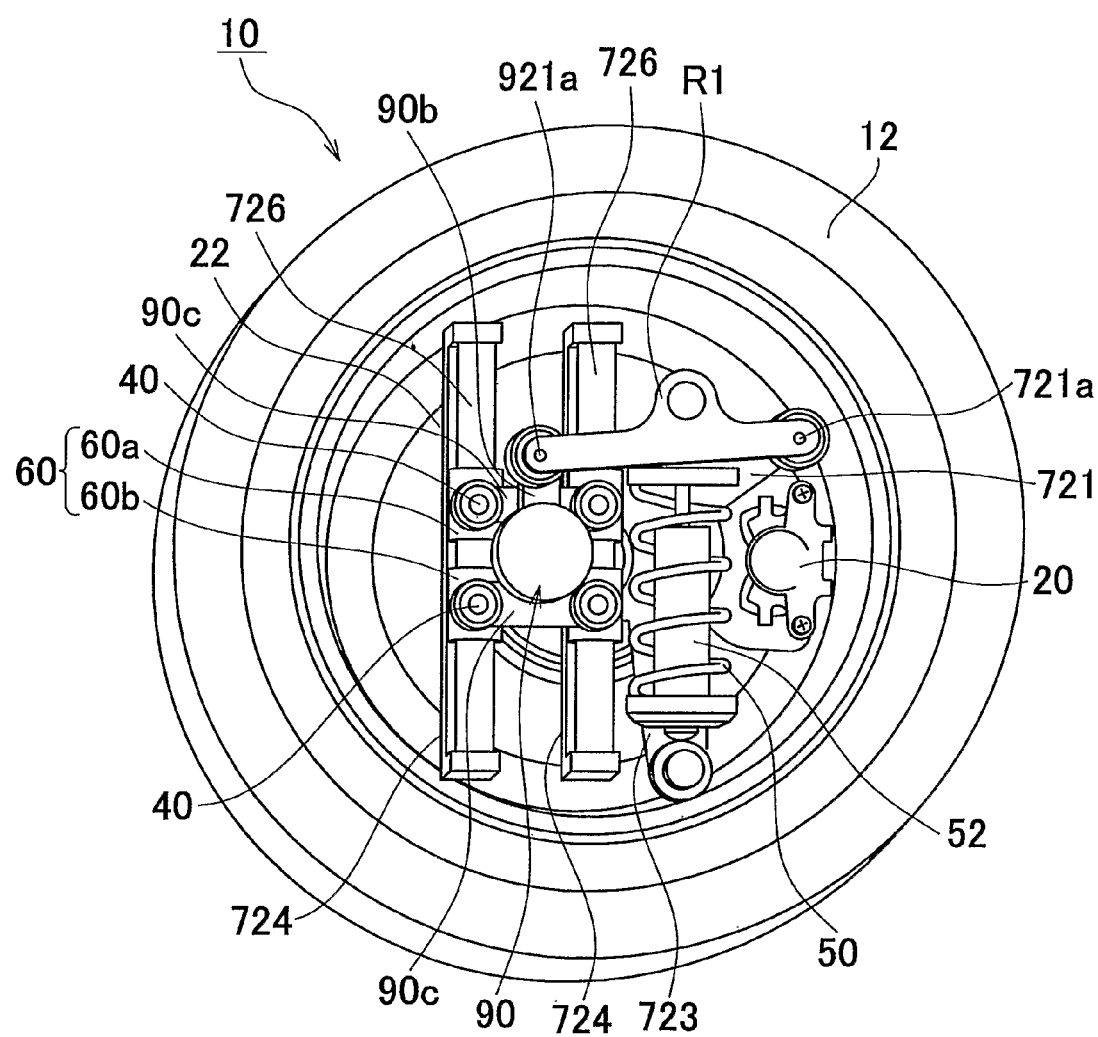
FIG. 26 illustrates the perspective view of the tire/wheel assembly 10, showing the structure of the main portions of an in-wheel suspension according to a modified example of the embodiments of the invention.

Also, in the embodiments described above, one set of sliding mechanism (the sliding shaft member 726 and the sliding member 60) is used. However, two or more sets of sliding mechanisms may be used. For example, the same effects as those in the above-described embodiments can be obtained by using two sets of sliding mechanisms (two sliding shaft members 726 and two sliding members 60), as shown in FIG. 26. In the example shown in FIG. 26, the upper end of the spring 50/absorber 52 is fitted to the first link R1 from the outside of the vehicle in the vehicle-width direction.

Also, in the embodiments described above, the arm 90 and the sliding member 60 are connected to each other via the ball-joint 40. However, the invention is not limited to this structure. For example, the arm 90 and the sliding member 60 may connected to each other via a bushing.

The invention claimed is:

1. An in-wheel suspension, comprising:
   a wheel;
   a carrier that rotatably supports the wheel;
   an arm that is coupled with a vehicle body, and that extends into the wheel;
   at least one link that is coupled with the carrier so as to be pivotable about a first shaft substantially parallel to a wheel rotation axis and coupled with the arm so as to be pivotable about a second shaft substantially parallel to the wheel rotation axis, the at least one link extending in a longitudinal direction of a vehicle; and
   at least one of an elastic element and an attenuation element that is arranged between the carrier and the link.

2. The in-wheel suspension according to claim 1, wherein the at least one link is directly coupled with the carrier with a ball-joint.

3. The in-wheel suspension according to claim 1, wherein the at least one link is directly coupled with the carrier with a pin.

4. The in-wheel suspension according to claim 1, wherein the at least one link is directly coupled with the carrier with an elastic member.

5. An in-wheel suspension, comprising:
   a wheel;
   a carrier that rotatably supports the wheel;
   an arm that is coupled with a vehicle body, and that extends into the wheel;
   at least one link that is coupled with the carrier so as to be pivotable about a first shaft substantially parallel to a wheel rotation axis and coupled with the arm so as to be pivotable about a second shaft substantially parallel to the wheel rotation axis, the at least one link extending in a longitudinal direction of a vehicle;
   at least one of an elastic element and an attenuation element that is arranged between the carrier and the link; and
   a mechanism that guides a movement of the arm in a vertical or substantially vertical direction.

6. An in-wheel suspension, comprising:
   a wheel;
   a carrier that rotatably supports the wheel;
   an arm that is coupled with a vehicle body, and that extends into the wheel;
   a first link that is coupled with the carrier so as to be pivotable about a first shaft substantially parallel to a wheel rotation axis and coupled with the arm so as to be pivotable about a second shaft substantially parallel to the wheel rotation axis, the first link extending in a longitudinal direction of a vehicle;
   a second link that is arranged below the first link, the second link coupled with the carrier so as to be pivotable about a third shaft substantially parallel to the wheel rotation axis and coupled with the arm so as to be pivotable about a fourth shaft substantially parallel to the wheel rotation axis, the second link extending in a longitudinal direction of the vehicle; and
   at least one of an elastic element and an attenuation element that is arranged between the carrier and the first link or the second link.

7. The in-wheel suspension according to claim 6, wherein coupling points at which the first link and the second link are coupled with the carrier are set on a rear side of a wheel center such that a moment for increasing a toe-in-angle is generated when a lateral force is applied to the vehicle.

8. The in-wheel suspension according to claim 6, wherein a line that connects a midpoint between a coupling point at which the first link is coupled with the arm and a coupling point at which the second link is coupled with the arm, to a midpoint between a coupling point at which the first link is coupled with the carrier and a coupling point at which the second link is coupled with the carrier tilts upward toward a front of the vehicle.

9. The in-wheel suspension according to claim 6, wherein a span length between a coupling point at which the first link is coupled with the arm and a coupling point at which the second link is coupled with the arm is longer than a span length between a coupling point at which the first link is coupled with the carrier and a coupling point at which the second link is coupled with the carrier.

10. The in-wheel suspension according to claim 6, wherein
each of the first link and the second link includes an arm-side link that is pivotable about the second shaft for the first link and fourth shaft for the second link with respect to the arm, and a carrier-side link that is pivotably coupled with the arm-side link and that is pivotable about the second shaft for the first link and fourth shaft for the second link with respect to the carrier, and
one of the first link and the second link is coupled with the carrier via a first restraining link, and the other of the first link and the second link is coupled with the carrier via a second restraining link or the first link and the second link are coupled with each other via the second restraining link.

11. The in-wheel suspension according to claim 10, wherein
the second restraining link couples the first link with the second link, and
at least one of the elastic element and the attenuation element is arranged between the second restraining link and the carrier.

12. The in-wheel suspension according to claim 6, wherein
the attenuation element is a rotary absorber that has a rotating shaft and that attenuates a rotational force transmitted to the rotating shaft, and
the in-wheel suspension further comprises a gear that is provided to the first link or the second link, that pivots in accordance with a pivot motion of the first link or the second link, and that transmits the rotational force to the rotating shaft of the rotary absorber.

13. The in-wheel suspension according to claim 12, wherein
the rotary absorber is arranged in a space formed in an end portion of the arm.

14. The in-wheel suspension according to claim 6, wherein
each of the first link and the second link includes an arm-side link that is pivotable about the second shaft for the first link and fourth shaft for the second link with respect to the arm, and a carrier-side link that is pivotably coupled with the arm-side link and that is pivotable about the second shaft for the first link and fourth shaft for the second link with respect to the carrier,
a restraining link connects a first coupling portion at which the arm-side link and the carrier-side link of the first link are coupled with each other, to a second coupling portion at which the arm-side link and the carrier-side link of the second link are coupled with each other, and
at least one of the first coupling portion and the second coupling portion is pivotably coupled with the restraining link via an elastic member.

15. An in-wheel suspension, comprising:
a wheel;
a carrier that rotatably supports the wheel;
an arm that is coupled with a vehicle body, and that extends into the wheel;
at least one link that is coupled with the carrier so as to be pivotable about a first shaft substantially parallel to a wheel rotation axis and coupled with the arm so as to be pivotable about a second shaft substantially parallel to the wheel rotation axis, the at least one link extending in a longitudinal direction of a vehicle;
at least one of an elastic element and an attenuation element that is arranged between the carrier and the link;
a sliding shaft member that is provided to the carrier, and that extends in a vertical or substantially vertical direction in the wheel; and
a sliding member that is provided around the sliding shaft member so as to be slidable with respect to the sliding shaft member in an axial direction and a circumferential direction of the sliding shaft member, and that is pivotably connected to the arm.

16. The in-wheel suspension according to claim 15, wherein
a connection portion at which the sliding shaft member is connected to the arm is arranged at a side portion of the sliding shaft member in a vehicle-width direction.

17. The in-wheel suspension according to claim 15, wherein
the sliding shaft member is arranged on a rear side of a vertical axis that passes a center of a tire/wheel assembly.

18. The in-wheel suspension according to claim 15, wherein
the at least one link includes a second link,
the first link is coupled with the carrier at a front end, and coupled with the arm at a rear end,
the second link is apart from the first link in the vertical or substantially vertical direction, and is connected to the carrier at a front end, and coupled with the arm at a rear end, and
a span length between a coupling point at which the first link is coupled with the arm and a coupling point at which the second link is coupled with the arm is shorter than a span length between a coupling point at which the first link is coupled with the carrier and a coupling point at which the second link is coupled with the carrier.

19. The in-wheel suspension according to claim 15, wherein
the sliding member is connected to the arm at two connection portions that are apart from each other in the vertical or substantially vertical direction.

20. The in-wheel suspension according to claim 19, wherein
a line extending in the axial direction of the sliding shaft member and a line connecting the two connection portions at which the sliding member is connected to the arm are non-parallel and non-coplanar.

21. The in-wheel suspension according to claim 15, wherein
the sliding member has an upper portion and a lower portion that are apart from each other in the vertical or substantially vertical direction, and each of the upper portion and the lower portion is pivotably connected to the arm.

* * * * *